(12) United States Patent
Morinaka et al.

(10) Patent No.: US 11,346,999 B2
(45) Date of Patent: May 31, 2022

(54) OPTICAL FIBER CABLE, HARNESS, AND METHOD OF MANUFACTURING OPTICAL FIBER CABLE

(71) Applicant: Mitsubishi Chemical Corporation, Tokyo (JP)

(72) Inventors: Takeshi Morinaka, Tokyo (JP); Akinori Ishikado, Tokyo (JP); Hideki Kihara, Tokyo (JP)

(73) Assignee: Mitsubishi Chemical Corporation, Tokyo (JP)

( * ) Notice: Subject to any disclaimer, the term of this patent is extended or adjusted under 35 U.S.C. 154(b) by 0 days.

(21) Appl. No.: 17/017,793

(22) Filed: Sep. 11, 2020

(65) Prior Publication Data

US 2020/0408987 A1 Dec. 31, 2020

Related U.S. Application Data

(63) Continuation of application No. PCT/JP2019/010585, filed on Mar. 14, 2019.

(30) Foreign Application Priority Data

Mar. 14, 2018 (JP) .............................. JP2018-046415
Mar. 28, 2018 (JP) .............................. JP2018-061725

(51) Int. Cl.
  *G02B 6/44* (2006.01)
  *G02B 6/02* (2006.01)
  (Continued)

(52) U.S. Cl.
  CPC ..... *G02B 6/02395* (2013.01); *G02B 6/02033* (2013.01); *G02B 6/03622* (2013.01); *G02B 6/3833* (2013.01); *G02B 6/443* (2013.01)

(58) Field of Classification Search
  CPC ............................ G02B 6/02395; G02B 6/443
  See application file for complete search history.

(56) References Cited

U.S. PATENT DOCUMENTS

2009/0067794 A1  3/2009  Aoyagi et al.
2011/0176814 A1  7/2011  Tsukamoto et al.

FOREIGN PATENT DOCUMENTS

JP  2000-109743 A  4/2000
JP  2002-055246 A  2/2002
(Continued)

OTHER PUBLICATIONS

English translation of KR 20110022692 A by Google Patents (Year: 2011).*

(Continued)

*Primary Examiner* — Charlie Y Peng
(74) *Attorney, Agent, or Firm* — Morgan, Lewis & Bockius LLP

(57) ABSTRACT

An optical fiber cable comprising an optical fiber, and a jacketing layer including at least two or more layers of a jacketing inner layer and a jacketing outer layer formed in this order concentrically, wherein the jacketing layer comprises at least two or more layers of a jacketing inner layer and a jacketing outer layer formed in this order concentrically; a material constituting the jacketing inner layer is composed of a resin material having an oxygen permeability of 2.0 cc·20 μm/(m²·day·atm) or less; a material constituting the jacketing outer layer comprises at least one selected from (Continued)

a polyolefin-based resin, a polybutylene terephthalate-based resin, and a fluorine-based resin containing no chlorine atom in its structure; and the following general formula (i) and (ii) are satisfied when an outer diameter of the optical fiber is denoted by A (μm), an outer diameter of the optical fiber cable is denoted by B (μm), and a thickness of the jacketing outer layer is denoted by c (μm):

$$900 \leq A \leq 1100 \tag{i}$$

$$0.40 \leq 2 \times c/(B-A) \leq 0.70 \tag{ii}.$$

21 Claims, 2 Drawing Sheets

(51) Int. Cl.
*G02B 6/036* (2006.01)
*G02B 6/38* (2006.01)

(56) References Cited

FOREIGN PATENT DOCUMENTS

| | | | |
|---|---|---|---|
| JP | 2003-261784 A | | 9/2003 |
| JP | 2004-219815 A | | 8/2004 |
| JP | 2005317414 A | * | 11/2005 |
| JP | 2007-047371 A | | 2/2007 |
| JP | 2010-033043 A | | 2/2010 |
| JP | 5430086 B2 | * | 2/2014 ............. G02B 1/046 |
| JP | 2014-164014 A | | 9/2014 |
| JP | 2015-014718 A | | 1/2015 |
| KR | 20110022692 A | * | 3/2011 ............. G02B 1/046 |
| WO | 2006/121048 A1 | | 11/2006 |
| WO | 2007/083553 A1 | | 7/2007 |
| WO | 2009/157444 A1 | | 12/2009 |

OTHER PUBLICATIONS

Kuraray technical data sheet for EVAL E105B (Year: 2016).*
International Search Report issued in related International Patent Application No. PCT/JP2019/010585 dated Jun. 4, 2019.

* cited by examiner

OPTICAL FIBER CABLE, HARNESS, AND METHOD OF MANUFACTURING OPTICAL FIBER CABLE

TECHNICAL FIELD

The present invention relates to an optical fiber cable, a harness, and a method of manufacturing an optical fiber cable.

BACKGROUND ART

Optical fibers are used in a wide range of applications, such as communications, sensors, lighting, decorations, displays, and the like. Among optical fibers, a plastic optical fiber having a structure in which an outer periphery of a core made of a highly transparent resin such as polymethyl methacrylate is coated with a resin having a higher transparency and a lower refractive index than the core, has advantages such as lightening of the entire system and excellent workability and flexibility as compared with glass-based optical fibers.

In recent years, plastic optical fibers have been used in mobile communication applications in automobiles, railways, and airplanes, etc., and in OA and sensor applications in factories, because of the improved transmission distance and heat resistance with the improvement of manufacturing technology. In the above applications, it is desired that even if the optical fiber under 105° C. environment is used for a long time, there is no significant increase in the transmission loss of the optical fiber, i.e. an optical fiber having an excellent long-term heat resistance at 105° C. is required.

Usually, an optical fiber is not often used in an optical fiber alone, and in order to impart heat resistance, mechanical properties, flame retardancy, discrimination, etc., the optical fiber is used as an optical fiber cable in which the optical fiber is coated with a thermoplastic resin or the like as a jacketing layer.

An optical fiber cable used in mobile communication applications in automobiles or railways, etc. is provided with a jacketing layer inside the jacketing layer (hereinafter, referred to as an "inner jacketing layer") for imparting heat resistance, and a jacketing layer on an outer side of the jacketing layer (hereinafter, referred to as an "outer jacketing layer") for imparting mechanical properties, flame retardancy, discrimination, further heat resistance, and the like.

Furthermore, when an optical fiber cable is disposed in a moving body such as automobiles or railways, it is often laid in the form of a harness bundling two or more kinds of optical fiber cables, or the form of a harness bundling the optical fiber cable and a wire or wire cable.

However, when an optical fiber cable is exposed to a high temperature environment in a state in which the optical fiber cable is bundled with another cable containing vinyl chloride-based resin in the jacketing layer, or in a state in which the optical fiber cable and another cable are bundled with a tape containing vinyl chloride-based resin, there has been problems that the plasticizer in the vinyl chloride-based resin is transferred to the jacketing layer of the optical fiber cable to form cracks in the jacketing layer, and that the plasticizer is transferred to the optical fiber to impair the optical characteristics. That is, there has been a demand for an optical fiber cable having excellent resistance to a plasticizer in a vinyl chloride-based resin. There are many types of plasticizers in vinyl chloride resins, including phthalic acid-based plasticizers, adipic acid-based plasticizers, phosphoric acid-based plasticizers, trimellitic acid-based plasticizers, epoxy-based plasticizers, and aliphatic dibasic acid-based plasticizers. The main examples include di-2-ethylhexylphthalate (DOP), bis(2-ethylhexyl) phthalate (DEHP), and diisononyl phthalate (DINP) as a phthalic acid-based plasticizer, and tris(2-ethylhexyl) trimellitate as a trimellitic acid-based plasticizer.

Further, an optical fiber cable used in a moving body such as automobiles or railways, when connected to the light source of a transmitter or the light receiving element of the receiver, the outer jacketing layer is peeled by the required length, and a plug or ferrule for connection is attached to the surface of the inner jacketing layer by a method such as a laser fusion method or "caulking" method.

As a method of imparting long-term heat resistance under a high temperature environment of 100 to 105° C. to an optical fiber, for example, in Patent Literature 1, a method of manufacturing an optical fiber cable in which a plastic optical fiber is coated using a jacketing material containing an ethylene-vinyl alcohol copolymer at a specific temperature condition has been proposed.

In Patent Literature 2, as a method of imparting long-term heat resistance under a high temperature environment of more than 110° C., an optical fiber cable in which a plastic optical fiber is coated with an oxygen shielding layer made of an ethylene-vinyl alcohol copolymer, and further an outer layer on its outer side is proposed.

Patent Literature 3 discloses an optical fiber cable in which a protective jacketing layer formed of an ethylene-vinyl alcohol copolymer resin and a light blocking jacketing layer formed of nylon 12 are coated on the outer periphery of an optical fiber.

CITATION LIST

Patent Literature

Patent Literature 1: JP2007-47371A
Patent Literature 2: JP2002-055246A
Patent Literature 3: WO2009/157444A1

SUMMARY OF INVENTION

Technical Problem

However, since the optical fiber cable proposed in Patent Literatures 1 to 3 has a jacketing layer formed of an ethylene-vinyl alcohol copolymer resin, although the long-term heat resistance at 105° C. is good, resistance to plasticizers of vinyl chloride-based resins has been insufficient.

Accordingly, a first object of the present invention is to provide an optical fiber cable excellent in resistance to plasticizers of vinyl chloride-based resins and long-term heat resistance at 105° C., and a harness containing the same.

Incidentally, plasticizers of vinyl chloride-based resins targeted by the present invention includes di-2-ethylhexyl phthalate (DOP), bis (2-ethylhexyl) phthalate (DEHP), diisononyl phthalate (DINP), adipic acid-based polyester, and tris (2-ethylhexyl) trimellitate (hereinafter, abbreviated as "plasticizer of vinyl chloride-based resin")

Furthermore, the present inventors have found, as an embodiment of an optical fiber cable to solve the above problems in the present invention, an optical fiber cable in which a jacketing layer is formed such that a jacketing inner layer, a jacketing intermediate layer and a jacketing outer layer are formed in this order concentrically on the outer periphery of an optical fiber. However, it was found from the study of the present inventors that when simply by coating the jacketing inner layer, and then forming the jacketing intermediate layer for obtaining a peripheral portion of an optical fiber cable, the adhesion between the jacketing inner layer and the jacketing intermediate layer becomes insufficient, and accordingly when peeling the jacketing outer layer of the optical fiber cable in order to attach a plug or ferrule for connection, the jacketing intermediate layer is peeled off, and hence the connecting plug or the like cannot be attached.

Accordingly, a second object of the present invention is to provide a method of manufacturing an optical fiber cable in which a jacketing layer is formed such that a jacketing inner layer, a jacketing intermediate layer and a jacketing outer layer are formed in this order concentrically on the outer periphery of an optical fiber, and the adhesion between the jacketing inner layer and the jacketing intermediate layer is excellent.

Solution to Problem

As a result of repeated studies made by the present inventors to solve the above problems, this invention is completed.

That is, according to a first aspect of the present invention, there is provided an optical fiber cable comprising an optical fiber and a jacketing layer formed on the outer periphery of the optical fiber, wherein the jacketing layer comprises at least two or more layers of a jacketing inner layer and a jacketing outer layer formed in this order concentrically; a material constituting the jacketing inner layer is composed of a resin material having an oxygen permeability of 2.0 cc·20 μm/(m²·day·atm) or less; a material constituting the jacketing outer layer comprises at least one selected from a polyolefin-based resin, a polybutylene terephthalate-based resin, and a fluorine-based resin containing no chlorine atom in its structure; and the following general formula (i) and (ii) are satisfied when an outer diameter of the optical fiber is denoted by A (μm), an outer diameter of the optical fiber cable is denoted by B (μm), and a thickness of the jacketing outer layer is denoted by c (μm):

$$900 \leq A \leq 1100 \quad \text{(i)}$$

$$0.40 \leq 2 \times c/(B-A) \leq 0.70 \quad \text{(ii)}.$$

According to a second aspect of the present invention, there is provided a harness obtained by bundling the optical fiber cable (C1), and a cable (C2) including a jacketing layer composed of a material containing a vinyl chloride-based resin.

According to a third aspect of the present invention, there is provided a method of manufacturing an optical fiber cable comprising an optical fiber and a jacketing layer formed on the outer periphery of the optical fiber, the jacketing layer being obtained by forming a jacketing inner layer, a jacketing intermediate layer and a jacketing outer layer in this order concentrically, wherein a material constituting the jacketing inner layer is an ethylene-vinyl alcohol-based resin; a material constituting the jacketing intermediate layer comprises a polyamide-based resin (N); a material constituting the jacketing outer layer comprises at least one selected from a polyolefin-based resin, a polybutylene terephthalate-based resin, and a fluorine-based resin containing no chlorine atom in its structure; and, the method comprises coating the jacketing inner layer and the jacketing intermediate layer simultaneously on the outer periphery of the optical fiber by supplying the material constituting the jacketing inner layer and the material constituting the jacketing intermediate layer into a co-extrusion coating apparatus with a compression type two-layer collective coating cross head.

Advantageous Effect of Invention

According to an embodiment of the present invention, it is possible to provide an optical fiber cable having excellent resistance to a plasticizer of a vinyl chloride-based resin (hereinafter, referred to as "plasticizer resistance of optical fiber cable") and long-term heat resistance at 105° C. (hereinafter, referred to as "105° C. long-term heat resistance"), and a harness containing the same.

According to another embodiment of the present invention, in an optical fiber cable in which a jacketing layer is formed such that a jacketing inner layer, a jacketing intermediate layer and a jacketing outer layer are formed in this order concentrically on the outer periphery of an optical fiber, it is possible to provide a method of stably manufacturing an optical fiber cable having excellent adhesion between the jacketing inner layer composed of a material containing a EVOH resin and a jacketing intermediate layer composed of a material containing a nylon-based resin (polyamide-based resin).

According to the manufacturing method of the present invention, it is possible to produce an optical fiber cable having excellent workability when attaching a plug or ferrule to an end portion of the optical fiber cable.

DESCRIPTION OF EMBODIMENTS

Hereinafter, embodiments of the present invention will be described with reference to the accompanying drawings, but the present invention is not limited to these drawings.

In the present invention, "(meth)acrylate" means at least one kind selected from "acrylate" and "methacrylate", and "(meth)acrylic acid" means at least one kind selected from "acrylic acid" and "methacrylic acid".

In the present invention, "monomer" means an unpolymerized compound, and "repeating unit" means a unit derived from a monomer by polymerizing the monomer. The repeating unit may be a unit formed directly by a polymerization reaction, and may be a unit in which a portion of the unit has been converted into another structure by treating a polymer.

In the present invention, "% by mass" indicates a content ratio of a predetermined component contained in 100% by mass of the total amount.

Unless otherwise indicated, a numerical range represented by using "to" in this specification means a range including numerical values described before and after "to" as a lower limit value and an upper limit value, and "A to B" means A or more and B or less.

Unless otherwise indicated, in this specification, for example, "vinylidene fluoride (VDF)-tetrafluoroethylene (TFE)-hexafluoropropylene (HFP) copolymer" means "a copolymer of a repeating unit derived from VDF and a repeating unit derived from TFE and a repeating unit derived from HFP"

(Optical Fiber Cable)

An optical fiber cable of the present invention includes an optical fiber, and a jacketing layer formed on the outer periphery of the optical fiber. The jacketing layer includes at least two or more layers which are formed such that a jacketing inner layer and a jacketing outer layer are formed in this order concentrically on the outer periphery of the optical fiber.

Figure 1:
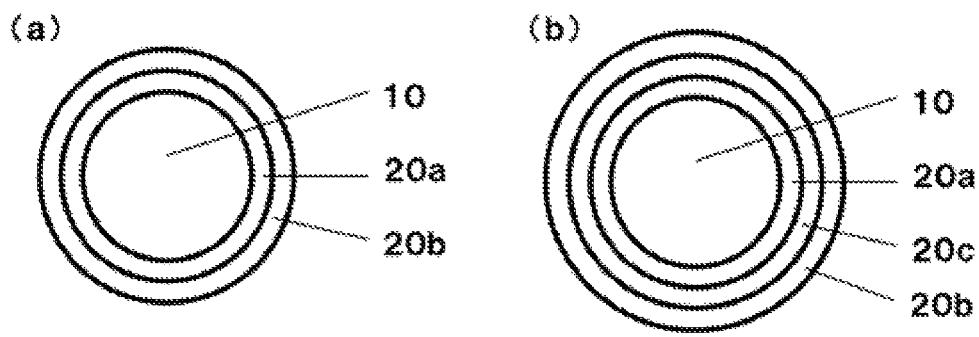
FIG. 1 is a schematic sectional view showing an example of an optical fiber cable of the present invention.

As a specific embodiment of such an optical fiber cable, for example, there is an optical fiber cable includes a jacketing layer composed of two layers, i.e., the jacketing inner layer 20a and a jacketing outer layer 20b on the outer periphery of the optical fiber 10 as shown in FIG. 1(a).

The jacketing layer may further include a jacketing intermediate layer between the jacketing inner layer and the jacketing outer layer to take a form including at least three or more layers in which the jacketing inner layer, the jacketing intermediate layer and the jacketing outer layer are concentrically formed in this order. The jacketing layer includes an embodiment composed of three layers in which the jacketing inner layer, the jacketing intermediate layer and the jacketing outer layer are concentrically formed in this order. A specific embodiment of such an optical fiber cable includes, for example, an optical fiber cable having jacketing inner layer 20a, jacketing intermediate layer 20c, and jacketing outer layer 20b on the outer periphery of optical fiber 10, as shown in FIG. 1(b).

An optical fiber cable of the present invention includes a jacketing layer composed of at least two or more in which the jacketing inner layer to be described later, and the jacketing outer layer to be described later are arranged in this order, and each jacketing layer is formed concentrically on the outer periphery of the optical fiber to be described later. By having the jacketing inner layer, it is possible to obtain excellent 105° C. long-term heat resistance of the optical fiber cable. By having the jacketing outer layer, it is possible to make the plasticizer resistance of optical fiber cable excellent. A specific embodiment includes, for example, an optical fiber cable having jacketing inner layer 20a, and jacketing outer layer 20b on the outer periphery of optical fiber 10 as shown in FIG. 1(a).

Further, in an optical fiber cable of the present invention, when the outer diameter of the optical fiber is denoted by A (μm), the outer diameter of the optical fiber cable is denoted by B (μm), and the thickness of the jacketing outer layer is denoted by c (μm), and when satisfying the conditions of the following general formula (i), by satisfying the following general formula (ii), the plasticizer resistance of optical fiber cable can be excellent.

$$900 \leq A \leq 1100 \quad \text{(i)}$$

$$0.40 \leq 2 \times c/(B-A) \leq 0.70 \quad \text{(ii)}$$

Optical fiber cables used in communication applications in a moving body such as automobiles, railways, and airplanes have limitations on the upper limit of their outer diameter. Therefore, in order to increase the thickness of the jacketing outer layer, it is necessary to reduce the thickness of the jacketing inner layer or the thickness of the jacketing intermediate layer provided if necessary, and hence 105° C. long-term heat resistance is lowered. Therefore, the upper limit of 2×c/(B−A) is 0.70 or less from the viewpoint of well maintaining 105° C. long-term heat resistance of the optical fiber cable, more preferably 0.65 or less. On the other hand, the lower limit of 2×c/(B−A) is 0.40 or more, more preferably 0.50 or more, from the viewpoint that the plasticizer resistance of optical fiber cable becomes good. The upper limit and the lower limit described above can be arbitrarily combined. Specifically, 2×c/(B−A) is 0.40 or more and 0.70 or less, preferably 0.50 or more and 0.70 or less or 0.40 or more and 0.65 or less, and more preferably 0.50 or more and 0.65 or less.

The jacketing layer may include at least the jacketing inner layer and the jacketing outer layer, if necessary, to the extent that does not affect the effect of the present invention, another layer other than the jacketing inner layer and the jacketing outer layer, as the outermost layer of the jacketing layer.

Further, in an optical fiber cable of the present invention, by having a jacketing intermediate layer composed of a material containing a polyamide-based resin (N) between the jacketing inner layer and the jacketing outer layer, the 105° C. long-term heat resistance of the optical fiber cable can be more excellent.

A specific embodiment includes, for example, an optical fiber cable having jacketing inner layer 20a, jacketing intermediate layer 20c, and jacketing outer layer 20b on the outer periphery of the optical fiber 10 as shown in FIG. 1(b).

Hereinafter, the jacketing layer (jacketing inner layer, jacketing outer layer, jacketing intermediate layer), the optical fiber, and the manufacturing method of the optical fiber cable will be described in detail in this order.

[Jacketing Inner Layer]

The jacketing inner layer refers to a jacketing layer on the inner layer side when viewed from an optical fiber among two or more layers of the jacketing layer.

The jacketing inner layer is composed of a resin composition having an oxygen permeability of 2.0 cc·20 μm/(m²·day·atm) or less (hereinafter, abbreviated as "low oxygen permeability material")

Since the jacketing inner layer is composed of a low oxygen permeability material, 105° C. long-term heat resistance of the optical fiber becomes good.

The upper limit of the oxygen permeability of the low oxygen permeability material is 2.0 cc·20 μm/(m²·day·atm) or less, more preferably 0.8 cc·20 μm/(m²·day·atm) or less, even more preferably 0.25 cc·20 μm/(m²·day·atm) or less, and particularly preferably 0.1 cc·20 μm/(m²~day·atm) or less, from the viewpoint that the 105° C. heat resistance of the optical fiber cable becomes good.

The type of the low oxygen permeability material is not particularly limited, and examples thereof include an ethylen-vinyl alcohol-based resin (hereinafter, abbreviated as "EVOH resin") and a polyvinyl alcohol-based resin.

Among them, EVOH resin is preferable because EVOH resin has high oxygen blocking property, and can suppress an increase in transmission loss due to oxidative deterioration of an optical fiber in a high-temperature environment. EVOH resin is a copolymer resin containing a unit derived from ethylene (hereinafter abbreviated as "ethylene unit") and a unit derived from vinyl alcohol (hereinafter abbreviated as "vinyl alcohol unit"). A "unit derived from a monomer" constituting a copolymer resin is abbreviated as a "monomer unit". The content of EVOH resin in the low oxygen permeability material is not particularly limited as long as the effect of the present invention can be obtained, but is preferably within a range of 90 to 100% by mass, more preferably within a range of 95 to 100% by mass, and particularly preferably the low oxygen permeability material is EVOH resin.

EVOH resin is not particularly limited, but a copolymer in which a content ratio of ethylene units is in a range of 20 mol % or more and 50 mol % or less, a content ratio of vinyl alcohol units is in a range of 50 mol % or more and 80 mol % or less, based on 100 mol % of the total amount of the monomer units constituting EVOH resin, is preferred. The total amount of the ethylene units and vinyl alcohol units is preferably 90 mol % or more, more preferably 95 mol % or more, based on 100 mol % of the total amount of the monomer units constituting EVOH resin.

The upper limit of the content ratio of vinyl alcohol units in EVOH resin is not particularly limited, from the viewpoint that the mechanical strength of the optical fiber cable becomes good, with respect to the total amount 100 mol % of the monomer units constituting the ethylene-vinyl alcohol-based resin, preferably 80 mol % or less. It is more preferably 77 mol % or less, and still more preferably 74 mol % or less. The lower limit of the content ratio of vinyl alcohol units is not particularly limited, but is preferably 50 mol % or more based on 100 mol % of the total amount of the monomer units constituting the ethylene-vinyl alcohol-based resin, from the viewpoint that the 105° C. long-term heat resistance of the optical fiber cable becomes good. It is more preferably 56 mol % or more, still more preferably 65 mol % or more, and particularly preferably 69 mol % or more.

The upper limit of the content ratio of ethylene units in EVOH resin is not particularly limited, from the viewpoint that the 105° C. heat resistance of the optical fiber cable becomes good, with respect to the total amount 100 mol % of the monomer units constituting the ethylene-vinyl alcohol-based resin, preferable 50 mol % or less. It is more preferably 44 mol % or less, still more preferably 35 mol % or less, and particularly preferably 31 mol % or less. The lower limit of the content ratio of ethylene units is not particularly limited, but is preferably 20 mol % or more based on 100 mol % of the total amount of the monomer units constituting the ethylene-vinyl alcohol-based resin, from the viewpoint that the mechanical strength of the optical fiber cable becomes good. It is more preferably 23 mol % or more, and still more preferably 26 mol % or more.

Commercially available EVOH can include, for example, Soarnol D, DT, DC, Soarnol E, ET, A, AT (product name, manufactured by Nippon Synthetic Chemical Industry Co., Ltd.).

The upper limit of the melting point of EVOH resin is not particularly limited, but is preferably 195° C. or less, more preferably in the range of 180° C. or less, and a resin having a melt flow index in the range of 25 to 80 g/10 minutes measured at a load of 5 kgf (49N) at 210° C. in accordance with JIS K7210 is preferable, from the viewpoint of excellent molding stability of the optical fiber cable. The lower limit of the melting point of EVOH resins is not particularly limited, but is preferably 155° C. or more, more preferably 165° C. or more. If the melting point is too low, the difference from the crystal melting temperature of the jacketing outer layer or the jacketing intermediate layer becomes too large, and hence the molding stability when the functional jacketing layer is provided may decrease.

In this specification, the melting point is in accordance with ISO3146:2000 and is measured by a differential scanning calorimeter.

[Jacketing Outer Layer]

The jacketing outer layer refers to a jacketing layer on the outer layer side when viewed from the optical fiber among two or more layers constituting the jacketing layers.

The material constituting the jacketing outer layer includes at least one selected from a polybutylene terephthalate-based resin (E), a polyolefin-based resin (O) and a fluorine-based resin (F) containing no chlorine atom in its structure (hereinafter, simply referred to as "fluorine-based resin (F)").

(Polybutylene Terephthalate-Based Resin (E))

The polybutylene terephthalate-based resin (E) (hereinafter, abbreviated as "PBT resin (E)") can be used as one of the materials constituting the jacketing outer layer.

The PBT resin (E) is a polymer containing as a main constitutional unit a unit of an oligopoly 1,4-butylene terephthalate represented by the following general formula (4), which is synthesized by polycondensation of bishydroxybutyl terephthalate (BHT) or an oligomer thereof, obtained by an esterification reaction of 1,4-butanediol (tetramethylene glycol) and terephthalic acid, or a transesterification reaction of 1,4-butanediol and dimethyl terephthalate, or the like.

[Chemical formula 1]

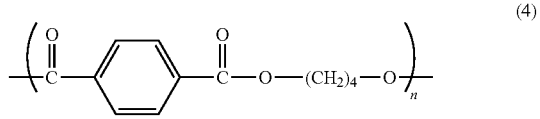

(4)

(n in the formula denotes a positive integer)

As a PBT resin (E) suitable for the present invention, more specifically, an elastomeric resin containing oligopoly-1,4-butylene terephthalate shown by the above-mentioned general formula (4) as a hard segment unit (crystalline phase); and, as a soft segment unit (amorphous phase), a block unit represented by the following general formula (5) synthesized by polycondensation of an aliphatic polyether (e.g., polytetramethylene glycol (PTMG) or the like) having a molecular weight in the range of 200 to 5000 with at least one of terephthalic acid, dimethyl terephthalate, diethyl terephthalate and dibutyl terephthalate, or a block unit of poly (ε-caprolactone) (PCL) represented by the following general formula (6), or a block unit of an aliphatic polyester such as polybutylene adipate (PBA), is preferred.

[Chemical formula 2]

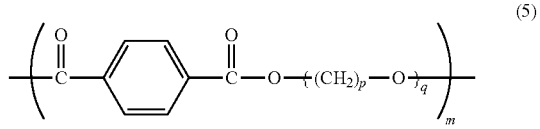

(5)

(in the formula, p denotes an integer from 4 to 12, q denotes an integer from 2 to 20, and m denotes a positive integer)

[Chemical formula 3]

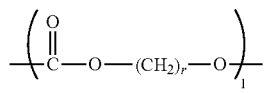

(in the formula, r denotes an integer of 1 or more, and 1 denotes a positive integer)

Among the above-mentioned PBT resins, in particular, PBT resins having a block unit containing an aliphatic polyether unit represented by the above general formula (5) as a soft segment unit are suitable from the view point that the durability of the optical performance of the optical fiber cable and the pull-out strength of the jacketing layer is maintained under high temperature and high humidity. In particular, a PBT resin which is a block copolymer containing a hard segment portion (A) (structure shown in Formula (4)) composed of an oligopoly 1,4-butylene terephthalate and a soft segment portion (B) (structure in the case of p=4 in Formula (5)) composed of a polycondensation material of terephthalic acid or terephthalate with a polytetramethylene glycol (PTMG) having a molecular weight ranging from 200 to 600 is preferred because it is excellent in durability of optical performance of the optical fiber cable and pull-out strength of the jacketing layer at high temperature and high humidity.

In addition, in the above PBT resin, the ratio (a/b) of the total number of moles (a) of 1,4-butylene terephthalate units contained in the hard segment portion (A) and the total number of moles (b) of 1,4-butylene terephthalate units contained in the soft segment portion (B) is preferably in the range of 15/85 to 30/70. If this ratio (a/b) is too small, the number of ether bonding units in the polymer main chain increases, so that the PBT resin tends to be deteriorated by hydrolysis under high temperature and high humidity, or the soft segment content ratio increases, so that the material itself is flexible and easily subjected to deformation, and hence the pull-out strength decreases. On the contrary, if this ratio (a/b) is too large, the content ratio of the hard segment increases, so that the melting point increases, and hence the coating stability decreases. This ratio (a/b) is more preferably 18/82 or more, and still more preferably 22/78 or more. On the other hand, this ratio is more preferably 27/73 or less, and even more preferably 25/75 or less.

Furthermore, it is preferable that the melting point of the PBT resin described above is in a range of 155° C. or more and 230° C. or less. If the melting point is too low, adhesion to the jacketing inner layer may decrease. On the other hand, if the melting point is too high, there is a possibility that the optical characteristics of the optical fiber deteriorate due to the influence of the thermal history when the jacketing outer layer is provided. The melting point of the PBT resin is more preferably 220° C. or less, and even more preferably 210° C. or less. Further, the melting point of the PBT resin is more preferably 165° C. or higher, and even more preferably 175° C. or higher.

In this specification, the melting point is in accordance with ISO3146:2000 and is measured by a differential scanning calorimeter.

The PBT resin as described above has low affinity for a plasticizer of a vinyl chloride resin. Therefore, even when an optical fiber cable of the present invention is bundled with a cable having a jacketing layer composed of a vinyl chloride-based resin, the plasticizer resistance and 105° C. long-term heat resistance of the optical fiber cable are good by the effect of preventing migration of a plasticizer of a vinyl chloride resin to the optical fiber constituting the optical fiber cable of the present invention.

Such PBT resin can be selected from, for example, Hytrel (trade name) 8068, 5547F, 6037F, 7237F manufactured by Du pont-Toray Co., Ltd., DURANEX (trade name) series manufactured by Polyplastics Co., Ltd., PELPRENE (trade name) S type, P type manufactured by Toyobo Co., Ltd., Novaduran (trade name) 5010N6-3X manufactured by Mitsubishi Engineering-Plastics Corporation, and Crastin (trade name) series manufactured by DuPont.

Among them, from the viewpoint of excellent flame retardancy, it is more preferable to use Hytrel (trade name) manufactured by Du pont-Toray Co., Ltd., or a Novaduran (trade name) 5010N6-3X manufactured by Mitsubishi Engineering-Plastics Corporation.

In the material constituting the jacketing outer layer, the lower limit of the content ratio of the PBT resin (E) is not particularly limited, but is preferably 70% by mass or more based on 100% by mass of the material constituting the jacketing outer layer from the viewpoint that the 105° C. long-term heat resistance and the plasticizer resistance of optical fiber cable become good. It is more preferably 80% by mass or more, and still more preferably 90% by mass or more. The upper limit of the content ratio of the PBT resin (E) in the material constituting the jacketing outer layer is not particularly limited, and may be 100% by mass.

(Polyolefin-Based Resin (O))

The polyolefin-based resin (O) can be used as one of materials constituting the jacketing outer layer.

The type of the polyolefin-based resin (O) is not particularly limited, but from the viewpoint that flame retardancy and mechanical strength become good in addition to 105° C. long-term heat resistance and plasticizer resistance of optical fiber cable, an olefin-based thermoplastic elastomer (X) obtained by blending a rubber component to be described later in an appropriate amount with the polypropylene-based resin (A) to be described later is preferred, and further preferably contains a phosphorus-based flame retardant (P) to be described later.

In the material constituting the jacketing outer layer, the lower limit of the content ratio of the polyolefin-based resin (O) is not particularly limited, but is preferably 70% by mass or more based on 100% by mass of the resin component of the material constituting the jacketing outer layer from the viewpoint that the 105° C. long-term heat resistance and the plasticizer resistance of optical fiber cable become good. It is more preferably 80% by mass or more, and still more preferably 90% by mass or more. The upper limit of the content ratio of the polyolefin-based resin (O) is not particularly limited, and may be 100% by mass.

In the material constituting the jacketing outer layer using the polyolefin-based resin (O), the lower limit of the content ratio of the phosphorus-based flame retardant (P) is preferably 40 parts by mass or more based on 100 parts by mass of the polyolefin-based resin (O) (e.g., olefin-based thermoplastic elastomer (X)) from the viewpoint that the flame retardancy of the optical fiber cable becomes good. It is more preferably 43 parts by mass or more, and still more preferable 45 parts by mass or more. The upper limit of the content ratio of the phosphorus-based flame retardant (P) is preferably 55 parts by mass or less from the viewpoint of lowering the mechanical properties (flexural elasticity, flexibility) of the optical fiber cable. It is more preferably 53 parts by mass or less, and still more preferably 50 parts by mass or less.

(Olefin-Based Thermoplastic Elastomer (X))

The olefin-based thermoplastic elastomer (X) can be used as one of materials constituting the jacketing outer layer containing the polyolefin-based resin (O)

The olefin-based thermoplastic elastomer (X) refers to an olefin-based thermoplastic elastomer in which a rubber component to be described later is blended in an appropriate amount into a polypropylene-based resin (A) to be described later.

As the polypropylene-based resin (A), a resin containing a polypropylene-based resin as a main component is used from the viewpoint of improving heat resistance of an optical fiber cable. Specific examples thereof include at least one selected from polypropylene, propylene-ethylene copolymer, propylene-alphaolefin copolymer, and blend composition of polypropylene and polyethylene. In particular, a blend composition of polypropylene (A1) and polyethylene (A2) is preferred from the viewpoint of easily adjusting the heat resistance and flexibility of the optical fiber cable by appropriately selecting the blending ratios of the respective polymers (A1 and A2). Furthermore, as long as it is a resin containing a polypropylene-based resin as a main component, a temperature at the time of forming a jacketing layer formed on an optical fiber can be set lower than 230° C., and a decrease in optical performance of an optical fiber generated during a coating process can be suppressed. Note that polypropylene denotes isotactic or syndiotactic polypropylene, and polyethylene denotes low density, medium density or high density polyethylene.

In the blend composition of polypropylene (A1) and polyethylene (A2) described above, the ratio of polypropylene (A1) and polyethylene (A2) may be appropriately selected according to the required temperature at which an optical fiber cable is used, but when the optical fiber cable is used for a long period of time at 100° C. or higher, the resin component is preferably composed of a mixture of 30 to 100 parts by mass of polypropylene (A1) and 0 to 70 parts by mass of polyethylene (A2), and when the optical fiber cable is used for a long period of time at 125° C. or higher, it is preferable to be composed of a mixture of 50 to 100 parts by mass of polypropylene (A1) and 0 to 50 parts by mass of polyethylene (A2). If the ratio of the polyethylene (A2) is too large, the heat resistance of such an optical fiber cable tends to decrease, for example the optical fiber cable tends to be thermally deformed at 100° C. or higher. The lower limit of the ratio of the polyethylene is not particularly limited, it may contain no polyethylene (A2) when the heat resistance of the optical fiber cable is needed sufficiently, or also, in order to impart flexibility to the optical fiber cable, the ratio of polyethylene (A2) is preferably 5 parts by mass or more, more preferably 10 parts by mass.

On the other hand, as the rubber component, at least one kind of polymers selected from a copolymer (B) containing units of ethylene and/or propylene and units of a non-conjugated diene as main components, and a copolymer (B') obtained by hydrogenating the copolymer (B) is preferred. Examples of the copolymer (B) include a block copolymer (Bb) composed of a polymer block (b1) containing units of ethylene and/or propylene as main components and a polymer block (b2) containing units of a non-conjugated diene compound as a main component, and examples of the copolymer (B') include a block copolymer (Bb') obtained by hydrogenating the block copolymer (Bb). Note that examples of the non-conjugated diene monomer include ethylidene norbornene, 1,4-hexadiene, and dichloropentadiene, but are not particularly limited thereto. In particular, a ternary copolymer of ethylen-propylene-non-conjugated diene monomer has an advantage that not only a function as the rubber component described above can be exhibited to provide an appropriate flexibility to the optical fiber cable, but also an effect of improving compatibility between polypropylene (A1) and polyethylene (A2) of the above resin component is provided.

In addition, hydrogenation of the copolymer (B) or (Bb) described above means that since the copolymer (B) or (Bb) contains unsaturated bonds (carbon-carbon double bonds) in the main chain and has inferior chemical stability such as heat resistance and weather resistance, the unsaturated bonds are changed into stable saturated bonds by hydrogenating unsaturated bond portions of the copolymer. By the hydrogenation reaction, as the amount of remaining double bonds contained in the main chain of the polymer decreases, that is, as the hydrogenation rate increases, the heat resistance, chemical resistance, weather resistance, and the like of the jacketing layer tend to be improved.

In the olefin-based thermoplastic elastomer (X), at room temperature the soft block as a rubber component having entropy elasticity has an effect of making the optical fiber cable flexible, in addition, at low temperatures takes the same behavior as a vulcanized rubber, and the hard block as a resin component has an effect of preventing its plastic deformation, and at high temperatures, since the resin component does not soften until its melting point, the elastomer (X) has sufficient heat resistance, and is flexible, and has excellent workability. Further, since the elastomer (X) is thermoplastic, it is possible to process the same as polyethylene and polypropylene, and after coating to an optical fiber, it does not require a complicated post-crosslinking treatment, and since the elastomer (X) as an olefinic polymer does not contain a low molecular weight compound that is transferred into a functional group and the optical fiber, the moist heat resistant characteristics of the optical fiber cable is also good.

The heat resistance and flexibility of the olefin-based thermoplastic elastomer (X) can be adjusted by a ratio of mixing the resin component and the rubber component. For example, in order to utilize in an application requiring heat resistance of 100° C. or more, or even 125° C. or more, which is required in automotive applications, it is preferable to be composed of a resin composition in which 5 to 40 parts by mass of a rubber component (e.g., a block copolymer (Bb and/or Bb')) is blended with 100 parts by mass of a resin component (resin component (A) containing a polypropylene-based resin as a main component), and it is more preferable to be composed of a resin composition in which 10 to 30 parts by mass of a rubber component is blended with 100 parts by mass of the resin component. If the ratio of the rubber component is too large, the heat resistance of the optical fiber cable and the molding stability when forming a jacketing layer formed on the optical fiber tend to decrease. If the ratio of the rubber component is too small, the flexibility of the optical fiber cable tends to decrease.

Furthermore, in the olefin-based thermoplastic elastomer (X), it is possible to improve the heat resistance by crosslinking (vulcanizing) the copolymer (B) or (Bb). Specifically, for example, to the copolymer (B) or (Bb), a sulfur compound as a vulcanizing agent (crosslinking agent), an organic peroxide as a crosslinking initiator, and further, in some cases, a filler, a vulcanization accelerator, or a vulcanization accelerator aid are added to perform crosslinking treatment (vulcanization). A called vulcanization system is a system in which a vulcanizing agent (crosslinking agent), a crosslinking initiator, a vulcanization accelerator, a vulcanization accelerator aid and a filler are combined. According to the structure, the property of the polymer, the performance required for the product, and the method of manufacturing the product, the vulcanization system used may be selected by selecting the type and amount of the component (for example, vulcanization accelerator) of the vulcanization system. Note that a vulcanization temperature needs to be equal to or higher than the decomposition temperature of the crosslinking initiator (organic peroxide)

Examples of the type of sulfur as the crosslinking agent include sulfur flower, deoxidized sulfur, powdered sulfur, precipitated sulfur, colloidal sulfur, and the like, but in particular, powdered sulfur is most often used. The selection of the crosslinking initiator (organic peroxide) needs to be conducted depending on the vulcanization method and the type of the crosslinking aid. Examples of the type of the organic peroxide include benzoyl peroxide, dicumyl peroxide, 2,5-dimethyl-2,5-di(t-butylperoxy)hexane, 1,1'-di-t-butylperoxy-3,3,5-trimethylenecyclohexane, and 1,3-di-(t-butylperoxy)-diisopropylbenzene. Examples of the type of the filler include barium sulfate, zinc oxide, carbonates, metal powders, and high specific gravity metal powders. Examples of the type of the vulcanization accelerator include a sulfenamide-based compound, a thiuram-based compound, a dithiocarbamate, a zinc butyl xanthate, a thiourea-based compound, a thiazole-based compound, an aldehyde ammonia-based compound, a guanidine-based compound, and examples of the type of the vulcanization accelerating aid include stearic acid and zinc stearate.

Examples of the olefin-based thermoplastic elastomer (X) available as a commercially available product include MILASTOMER (trade name) manufactured by Mitsui Chemical, Inc., OLEFISTA (trade name) manufactured by Mitsubishi Chemical Corporation, and the like. For example, examples of resins capable of satisfying the heat resistance of 100° C. or more, or even 125° C. or more, which are required for automotive applications, include MILASTOMER (trade name) 4010NS, 5020NS, 5030NS, 6020NS, 6030NS, 7030NS, 8032NS, 8030NS, 5030BS, 6030BS, 7030BS, 8030BS, 9020BS, 9020NS, 9070NS, 9070BKS, M2400BS, M4400BS, M3800BS, M4800BS, 3555B, 3655B, 3755B, 3855B, 3981B, Z102B, 5800B1, 215B, Z101N, 5850N, TT744N, which are manufactured by Mitsui Chemical, Inc., and OLEFISTA (trade name) QU1542R, which is manufactured by Mitsubishi Chemical Corporation.

In addition, the olefin-based thermoplastic elastomer (X) preferably has a thermal deformation temperature (load 4.6 kgf (45.1N)) of 90° C. or higher measured according to ASTMD-648, and in order to satisfy high heat resistance as required in automotive applications and so on, this thermal deformation temperature is more preferably 100° C. or higher, and even more preferably 110° C. or higher. If the thermal deformation temperature is too low, when the optical fiber cable is used in the vicinity of 100 to 105° C., the jacketing layer is significantly deformed, the optical performance of the optical fiber tends to decrease.

Furthermore, the melt flow index of the olefin-based thermoplastic elastomer (X) (under the condition of a load 5 kgf (49N) at temperature 210° C., the amount (g) of polymer discharged from the nozzle of the diameter of 2 mm, the length 8 mm in 10 minutes, measured in accordance with JIS K7210) is preferably in the range of 5 to 50. If the melt flow index is too low, when coating the jacketing layer formed on the optical fiber portion, the orientation strain tends to increase; and when increasing the processing temperature to suppress this orientation strain, thermal degradation of the optical fiber tends to occur. If the melt flow index is too high, the strength of the jacketing layer becomes extremely weak, which may cause inconvenience in use.

The material constituting the jacketing outer layer containing the olefin-based thermoplastic elastomer (X) or the like may contain, if necessary, an antioxidant, a light shielding agent such as a black inorganic pigment or the like (e.g., carbon black or the like) for preventing the incident of external light into an optical fiber, a inorganic or organic filler such as talc, a glass fiber, an aromatic polyamide, a carbon fiber, and the like.

(Phosphorus-Based Flame Retardant (P))

The phosphorus-based flame retardant (P) can be used as one of materials constituting the jacketing outer layer containing the polyolefin-based resin (O).

The type of the phosphorus-based flame retardant (P) is not particularly limited, and specific examples thereof include a phosphoric ester-based compound (hereinafter, abbreviated as "phosphoric ester") and a phosphonic ester-based compound (hereinafter, abbreviated as "phosphonic ester"). Specifically, the following compounds may be exemplified, but are not limited thereto. These compounds may be used alone or in combination of two or more.

1) Halogen-Free Phosphoric Ester:

Aromatic phosphoric esters such as monoethyl phosphate, monobutyl phosphate, methyl acid phosphate, ethyl acid phosphate, butyl acid phosphate, dibutyl phosphate, trimethylphosphate (TMP), triethyl phosphate (TEP), triphenyl phosphate (TPP), tricresyl phosphate (TCP), trixylenyl phosphate (TXP), cresyl diphenyl phosphate (CDP), 2-ethylhexyldiphenyl phosphate (EHDP), and their derivatives, and their condensates.

The reaction products of phosphorus oxychloride with divalent phenolic compounds, and phenols (or alkylphenols). For example, aromatic condensed phosphoric esters such as resorcinol bis-diphenylphosphate, resorcinol bis-dixylenyl phosphate, bisphenol A bis-diphenylphosphate, and their derivatives, and their condensates.

2) Halogen-Containing Phosphoric Ester:

Tris(chloroethyl)phosphate, tris(chloropropyl)phosphate, tris(dichloropropyl)phosphate, tris(dibromopropyl)phosphate, bis(2,3-dibromopropyl)-2,3-dichloropropylphosphate, bis(chloropropyl)octylphosphate, and the like, and their derivatives, and their condensates.

3) Phosphonic Ester:

Dimethyl vinyl phosphonate, diethyl vinyl phosphonate, diphenyl vinyl phosphonate, diphenyl vinyl phosphine oxide, and the like, and derivative compounds thereof, and their condensates.

As the halogen-free phosphoric ester, for example, the following commercially available products can be used: JAMP-2, JAMP-4, JAMP-8, JAMP-12, JP-501, JP-502, JP-504, JP-504A, JP-506H, JP-508, JP-512, JP-513, JP-5180, JP-524R, DBP, LB-58, which are trade names and manufactured by Johoku Chemical Co., Ltd.; TMP, TEP, TPP, TCP, TXP, CDP, PX-110, #41, CR-733S, CR-741, PX-200, DAIGUARD-580/610, which are trade names and manufactured by Daihachi Chemical Industry Co., Ltd.; and ADKSTAB FP-600, PFR, FP2100JC, FP-2200S, FP-2500S, which are trade names and manufactured by Adeka Corporation.

As the halogen-containing phosphoric ester, for example, the following commercially available products can be used: TMCPP, CRP, CR-900, CR-504L, CR-570, and DAI-GUARD-540, which are trade names and manufactured by Daihachi Chemical Industry Co., Ltd.

As the phosphonic acid ester, for example, the following commercially available products can be used: V series, which is trade name and manufactured by Katayama Chemical Inc., and Non-Nen 73, which is trade name and manufactured by Marubishi Oil Chemical Corporation.

Among the phosphorus-based flame retardants (P) described above, at least one selected from phosphoric esters and phosphonic esters is preferred because the flame retardancy of the resin molded article becomes good. Specific examples of the phosphoric ester include halogen-containing phosphoric esters.

(Fluorine-Based Resin (F))

The fluorine-based resin (F) can be used as one of materials constituting the jacketing outer layer.

The fluorine-based resin (F) is a fluorine-based resin substantially contains no chlorine atoms in the structure. Here, substantially containing no chlorine atoms in the structure means that chlorine atoms are not positively introduced into the structure of the fluorine-based resin. When the fluorine-based resin contains a chlorine atom in the structure, 105° C. long-term heat resistance of the optical fiber cable is lowered, and the fluorine-based resin becomes high affinity for a plasticizer of a vinyl chloride resin, and hence the plasticizer resistance of optical fiber cable is lowered.

The type of the fluorine-based resin (F) is not particularly limited, and specific examples thereof include at least one selected from a low molecular weight or high fluidity Teflon™-based resin, a vinylidene fluoride-based resin, or a vinylidene fluoride-based elastomer. Here, high fluidity means that the melt flow index (g/10 min) at 230° C., measured under a load of 5 kg according to JIS K7210, is 50 or more, more preferably 100 or more.

The fluorine-based resin (F) has low affinity for a plasticizer of a vinyl chloride resin. Hence, an optical fiber cable of the present invention has an effect of preventing migration of a plasticizer of a vinyl chloride resin into an optical fiber constituting an optical fiber cable of the present invention, even when used bundled with a cable having a jacketing layer composed of a vinyl chloride-based resin. Therefore, the plasticizer resistance of optical fiber cable and 105° C. long-term heat resistance are good.

Specifically, the fluorine-based resin (F) can be selected from SOLEF (trade mark)-1006 manufactured by Solvay, a KYNAR (trade mark) series manufactured by Arkema Inc., CEFRALSOFT (trade mark) G150 series manufactured by Central Glass Co., Ltd., Teflon (trade mark) PFA340-J manufactured by DuPont-Mitsui Fluorochemical Co., Ltd., and VP100, VP200 (trade mark) manufactured by Daikin Industries, Ltd.

In the material constituting the jacketing outer layer, the lower limit of the content ratio of the fluorine-based resin (F) is not particularly limited, but is preferably 70% by mass or more based on 100% by mass of the material constituting the jacketing outer layer from the viewpoint that the 105° C. long-term heat resistance and the plasticizer resistance of optical fiber cable become good. It is more preferably 80% by mass or more, and still more preferably 90% by mass or more. The upper limit of the content ratio of the fluorine-based resin (F) is not particularly limited, and may be 100% by mass.

[Jacketing Intermediate Layer]

The jacketing intermediate layer refers to a jacketing layer composed of a material containing a polyamide-based resin (N) to be described later, which is provided between the jacketing inner layer and the jacketing outer layer.

By providing the jacketing intermediate layer between the jacketing inner layer and the jacketing outer layer, heat resistance, mechanical properties and chemical resistance of the optical fiber cable, and laser weldability with a ferrule become good. The jacketing intermediate layer may be formed of one layer, or may be formed of at least two or more layers to carry two or more functions described above.

Since the jacketing intermediate layer is composed of a material containing a polyamide-based resin (N), the chemical resistance of the polyamide-based resin (N) and the affinity action with a ferrule material make the chemical resistance of optical fiber cable and the laser weldability with a ferrule good.

Examples of the polyamide resins (N) include aliphatic polyamides such as polyamide 6, polyamide 66, polyamide 612, polyamide 11, polyamide 12, and polyamide 1010; semiaromatic polyamides such as polyamide 4T (copolymer of 1,4-butanediamine and terephthalic acid), polyamide 6T (copolymer of 1,6-hexanediamine and terephthalic acid), polyamide MXD6 (copolymer of m-Xylylenediamine and adipic acid), polyamide 6I (copolymer of 1,6-hexanediamine and isophthalic acid), and polyamide 9T (copolymer of 1,9-nonanediamine and terephthalic acid). One kind of these polyamide-based resins (N) may be used alone, or two or more kinds thereof may be used in combination. Among these polyamide-based resins (N), polyamide 6, polyamide 66, polyamide 612, polyamide 11, polyamide 12, polyamide 1010, polyamide MXD6, polyamide 6T, and polyamide 9T are preferred, and polyamide 6, polyamide 66, polyamide 12, polyamide 11, and polyamide MXD6 are more preferred, and polyamide 66, polyamide 12, and polyamide 11 are even more preferred.

The lower limit of the content ratio of the polyamide-based resin (N) in the material constituting the jacketing intermediate layer is not particularly limited, but preferably 50% by mass or more, more preferably 60% by mass or more, still more preferably 70% by mass or more, based on 100% by mass of the material constituting the jacketing intermediate layer, in terms of 105° C. long-term heat resistance of optical fiber cable and excellent laser weldability with a ferrule. The upper limit of the content ratio of the polyamide-based resin (N) is not particularly limited, but preferably 90% by mass or less, more preferably 85% by mass or less, and still more preferably 80% by mass or less, based on 100% by mass of the material constituting the jacketing intermediate layer, in terms of obtaining an excellent adhesion between the jacketing inner layer and the jacketing intermediate layer of an optical fiber cable.

The melting point of the polyamide-based resin (N) is preferably 150° C. to 300° C., more preferably 180° C. to 280° C. When the melting point of the polyamide-based resin (N) is 150° C. or higher, the heat resistance of the optical fiber cable is excellent. When the melting point of the polyamide-based resin (N) is 300° C. or less, the resin has excellent workability.

In this specification, the melting point is in accordance with ISO3146:2000 and is measured by a differential scanning calorimeter.

The polyamide-based resin (N) may be an alloy resin of a polyamide-based resin and a resin compatible with the polyamide-based resin.

Examples of resins compatible with the polyamide resin include polyolefin resins, polyphenylene ether resins, polyester resins, polyacetal resins, and thermoplastic elastomers. One kind of resins compatible with the polyamide-based resins may be used alone, and two or more kinds thereof may be used in combination. Among the resins compatible with the polyamide-based resin, a polyolefin resin, a polyphenylene ether resin, and a polyester resin are preferred, and a polyolefin resin and a polyphenylene ether resin are more preferred because of their excellent heat resistance.

Compatibility means that when a polyamide-based resin and a resin compatible with the polyamide-based resin are melt-kneaded, they are uniformly dispersed each other and mixed together.

The content ratio of the polyamide-based resin in the alloy resin is preferably from 50% by mass to 90% by mass, more preferably from 60% by mass to 80% by mass, based on a total of 100% by mass of the polyamide-based resin and the resin compatible with the polyamide-based resin. When the content of the polyamide-based resin in the alloy resin is 50% by mass or more, an excellent 105° C. long-term heat resistance of optical fiber cable can be obtained. Further, when the content ratio of the polyamide-based resin in the alloy resin is 90% by mass or less, an excellent flexibility of the optical fiber cable can be obtained.

The content ratio of the resin compatible with the polyamide-based resin in the alloy resin is preferably from 10% by mass to 50% by mass, more preferably from 20% by mass to 40% by mass, based on a total of 100% by mass of the polyamide-based resin and the resin compatible with the polyamide-based resin. When the content ratio of the resin compatible with the polyamide-based resin in the alloy resin is 10% by mass or more, an excellent flexibility of the optical fiber cable can be obtained. When the content ratio of the resin compatible with the polyamide-based resin in the alloy resin is 50% by mass or less, an excellent 105° C. long-term heat resistance of the optical fiber cable can be obtained.

As a material constituting the jacketing intermediate layer, a mixture of the polyamide-based resin (N) and a material constituting the jacketing inner layer can be used.

Since the material constituting the jacketing intermediate layer includes a material constituting the jacketing inner layer, an affinity is obtained between the jacketing inner layer and the jacketing intermediate layer, and the adhesion between the jacketing intermediate layer and the jacketing inner layer of the optical fiber cable can be good.

Examples of the material constituting the jacketing inner layer described above include a EVOH resin as described in the section of the jacketing inner layer.

The blending ratio of the polyamide-based resin (N) and the material constituting the jacketing inner layer is preferably 10 parts by mass to 30 parts by mass of the material constituting the jacketing inner layer, more preferably 15 parts by mass to 25 parts by mass, with respect to 100 parts by mass of the polyamide-based resin (N). When the content ratio of the material constituting the jacketing inner layer is 10 parts by mass or more, the adhesion of the jacketing inner layer and the jacketing intermediate layer of the optical fiber cable can be good. When the content ratio of the material constituting the jacketing inner layer is 30 parts by mass or less with respect to 100 parts by mass of the polyamide-based resin (N), an effect due to the polyamide resin (N) can be sufficiently obtained.

Furthermore, the material constituting the jacketing intermediate layer may include another additive (Y) in addition to the polyamide-based resin (N). Examples of the other additive (Y) include a flame retardant, a flame retardant aid, a heat stabilizer, a lubricant, a melt tension improver, an acid receiving agent, an anti-blocking agent, and a pigment. One kind of these other additives (Y) may be used alone, or two or more kinds thereof may be used in combination.

The content ratio of the other additive (Y) may be set within a range not impairing the original performance of the polyamide-based resin (N) and the performance of an optical fiber cable of the present invention. From such viewpoint, the content ratio of the other additive (Y) is preferably 50 parts by mass or less, more preferably 40 parts by mass or less, and still more preferably 30 parts by mass or less, based on 100 parts by mass of the material constituting the jacketing intermediate layer.

Examples of a method of mixing a material constituting the jacketing intermediate layer and a material constituting the jacketing inner layer, and a method of mixing another additive (Y) into a material constituting the jacketing intermediate layer include a method of melt-kneading using an apparatus such as a twin-screw extruder.

Examples of an apparatus for melt-kneading include a side feed type twin screw extruder in which an additive material feeder is attached between a main material hopper and the extruder, and an additive material is directly mixed into an extruder, and a vent type twin screw extruder in which a device for devolatilizing moisture content, a residual monomer, and the like at the time of extrusion is attached.

The temperature of melt-kneading of the material constituting the jacketing intermediate layer is preferably 200° C. to 300° C., more preferably 220° C. to 280° C. When the temperature of melt-kneading of the material constituting the jacketing intermediate layer is 200° C. or higher, it is possible to sufficiently knead the material constituting the jacketing intermediate layer. When the temperature of melt-kneading of the material constituting the jacketing intermediate layer is 300° C. or less, it is possible to knead without impairing the original performance of the polyamide-based resin.

The thickness of the jacketing intermediate layer is preferably 0.1 mm to 2.5 mm, more preferably 0.2 mm to 2 mm. When the thickness of the jacketing intermediate layer is 0.1 mm or more, 105° C. long-term heat resistance of optical fiber cable and oxygen interception can be excellent. When the thickness of the jacketing intermediate layer is 2.5 mm or less, the flexibility of the optical fiber cable and handling property can be excellent.

(Optical Fiber)

The optical fiber is not particularly limited as long as it has a function as an optical fiber, and a known optical fiber can be used. Examples of types of the optical fiber include step-index optical fiber, multistep index optical fiber, graded index optical fiber, multi-core optical fiber, and the like. Among these types of optical fibers, since it is excellent in heat resistance, step-index optical fiber and multi-core optical fiber are preferred, and since it allows longer distance communication, step-index optical fiber is more preferable.

Figure 2:
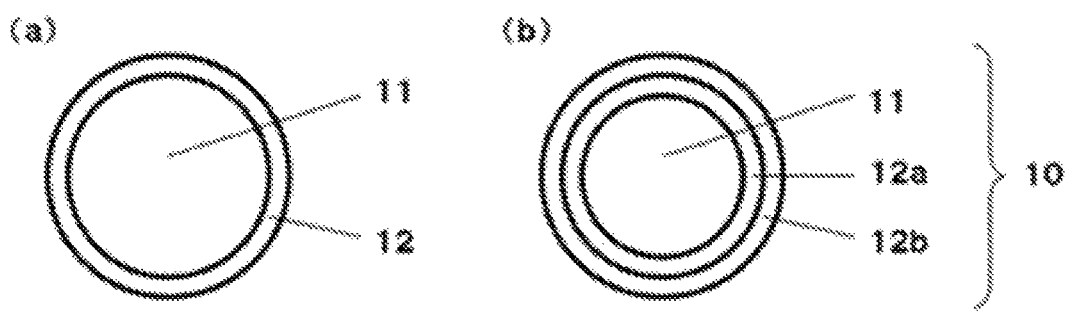
FIG. 2 is a schematic sectional view showing an example of a step-index type optical fiber which is an example of an optical fiber in an optical fiber cable of the present invention.

A step-index optical fiber totally reflects light at the interface between the core and the cladding layer, and propagates light in the core. Examples of the step index optical fiber includes a step index optical fiber having a core 11 and a cladding layer 12 of one layer formed on the outer periphery of the core 11, as shown in FIG. 2(*a*), and a step index type optical fiber having a core 11 and two layers of a cladding layer 12*a* and a cladding layer 12*b* on the outer periphery of the core 11, as shown in FIG. 2(*b*). The cladding layer may be one layer or two or more layers.

(Core)

The material of the core (core material) is not particularly limited as long as it is a material having high transparency, and can be appropriately selected depending on the purpose of use and the like. Examples of the material having high transparency include glass, and transparent resins such as acrylic resins, styrene-based resins, and polycarbonate-based resins.

The optical fiber using a transparent resin to the core is referred to as a plastic optical fiber, it is particularly suitable for an optical fiber cable of the present invention, and a method of manufacturing the optical fiber cable.

One kind of the transparent resins may be used alone, or two or more kinds thereof may be mixed and used. Among the above-described materials, acrylic resins and polycarbonate resins are preferred, because of their excellent transparency around a wavelength of 650 nm, and acrylic resins are more preferred because they are excellent in 105° C. long-term heat resistance, and are suitable for communication over a longer distance.

Examples of acrylic resins used for the core material include a methyl methacrylate homopolymer or a copolymer containing 50% by mass or more of methyl methacrylate units. Among these acrylic resins, a copolymer containing 60% by mass or more of methyl methacrylate units is more preferred, a copolymer containing 70% by mass or more of methyl methacrylate units is even more preferred, and a methyl methacrylate homopolymer is particularly preferred, because of excellent optical characteristics, mechanical characteristics, heat resistance, and transparency.

Examples of a method of manufacturing the core material include a bulk polymerization method, a suspension polymerization method, an emulsion polymerization method, and a solution polymerization method. Among these methods for producing a core material, a bulk polymerization method and a solution polymerization method are preferred because contamination of impurities can be suppressed.

(Cladding Layer)

The cladding layer is concentrically formed on the outer periphery of the core. The cladding layer may be one layer as shown in FIG. 2(a), two layers as shown in FIG. 2(b), or three or more layers.

The material of the cladding layer (clad material) is not particularly limited as long as it is a material having a refractive index lower than that of the core material, and can be appropriately selected depending on the composition of the core material, the purpose of use, and the like. When an acrylic resin is used as the core material, it is preferable to use a fluorine-based resin as the clad material because the transmission loss can be reduced. In particular, when a methyl methacrylate homopolymer or a copolymer containing 50% by mass or more of methyl methacrylate units are used as the core material, it is preferable to use a fluorine-based resin as the clad material because the transmission loss can be reduced.

Examples of the fluorine-based resin include vinylidene fluoride (VDF) homopolymers, VDF-trifluoroethylene copolymers, VDF-tetrafluoroethylene (TFE) copolymers, VDF-hexafluoropropylene (HFP) copolymers, VDF-TFE-HFP copolymers, VDF-TFE-HFP-(perfluoro) alkyl vinyl ether copolymers, VDF-hexafluoroacetone copolymers, VDF-TFE-hexafluoroacetone copolymers, ethylene-VDF-TFE-HFP copolymers, ethylene-TFE-HFP copolymers, ethylene-TFE-HFP-(perfluoro) alkyl vinyl ether copolymers, fluoroalkyl (meth)acrylate polymers, fluoroalkyl (meth)acrylate-alkyl (meth)acrylate copolymers. One kind of these fluorine-based resins may be used alone, or two or more kinds thereof may be mixed and used.

Among these fluorine-based resins, VDF-TFE copolymers, VDF-HEP copolymers, VDF-TFE-HFP copolymers, ethylene-VDF-TFE-HFP copolymers, ethylene-TFE-HFP copolymers, ethylene-TFE-HFP (perfluoro) alkyl vinyl ether copolymers, fluoroalkyl (meth)acrylate polymers, fluoroalkyl (meth)acrylate-alkyl (meth)acrylate copolymers are preferred because of their excellent flexibility, impact resistance, transparency, chemical resistance, and low cost.

Furthermore, among these fluorine-based resins, VDF-TFE-HFP copolymers, and ethylene-TFE-HFP-(perfluoro) alkyl vinyl ether copolymers are preferred because of their more excellent 105° C. long-term heat resistance. As such a VDF-TFE-HFP copolymer, a copolymer containing 10 to 60% by mass of VDF units, 20 to 70% by mass of TFE units, and 5 to 35% by mass of HFP units is preferred. As such an ethylen-TFE-HFP-(perfluoro) alkyl vinyl ether copolymer, a copolymer containing 10 to 80% by mass of ethylene units and 18 to 80% by mass of TFE units and 1 to 30% by mass of HFP units and 1 to 10% by mass of (perfluoro) alkyl vinyl ether units is preferred.

Especially when the cladding layer is one-layer, VDF-TFE copolymers, VDF-HEP copolymers, VDF-TFE-HFP copolymers, ethylene-VDF-TFE-HFP copolymers, ethylene-TFE-HFP copolymers, fluoroalkyl (meth)acrylate copolymer, and fluoroalkyl (meth)acrylate-alkyl (meth)acrylate copolymer are preferred because of their superior chemical resistance; and VDF-TFE copolymers, VDF-HEP copolymers, VDF-TFE-HFP copolymers, ethylene-VDF-TFE-HFP copolymers, and ethylene-TFE-HFP copolymers are more preferred because of their superior mechanical properties.

When the cladding layer is composed of two layers, since the leakage can be suppressed when the optical fiber is bent, for the first layer (inner layer, cladding layer 12a in case of FIG. 2(b)), fluoroalkyl (meth)acrylate polymers, fluoroalkyl (meth)acrylate-alkyl (meth)acrylate copolymers are preferable, and for the second layer (outer layer, cladding layer 12b in case of FIG. 2(b)) VDF-TFE copolymers, VDF-HEP copolymers, VDF-TFE-HFP copolymers, ethylene-VDF-TFE-HFP copolymers, and ethylene-TFE-HFP copolymers are preferable.

Examples of fluoroalkyl (meth)acrylate include long-chain fluoroalkyl (meth)acrylates shown in the following formula (1) such as 2-(perfluorohexyl) ethyl methacrylate (13FM) and 2-(perfluorooctyl) ethyl methacrylate (17FM), and short-chain fluoroalkyl (meth)acrylates shown in the following formula (2) such as 2,2,2-trifluoroethyl methacrylate (3FM).

[Chemical formula 4]

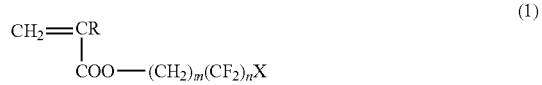

(1)

(In Formula (1), m denotes 1 or 2, n denotes an integer from 5 to 13, R denotes a hydrogen atom or a methyl group, and X denotes a hydrogen atom or a fluorine atom.)

[Chemical formula 5]

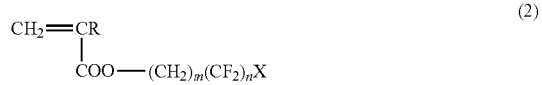

(2)

(In Formula (2), m denotes 1 or 2, n denotes an integer from 1 to 4, R denotes a hydrogen atom or a methyl group, and X denotes a hydrogen atom or a fluorine atom.)

Since a fluoroalkyl (meth)acrylate polymer or a fluoroalkyl (meth)acrylate-alkyl (meth)acrylate copolymer can reduce transmission loss, a copolymer comprising 10 to 50% by mass of a unit of a long-chain fluoroalkyl (meth)acrylate shown in the above formula (1), 20 to 90% by mass of a unit of a short-chain fluoroalkyl (meth)acrylate shown in the above formula (2), and 0 to 50% by mass of another copolymerizable monomer unit is preferred. Specifically, a 17FM-3FM-methyl methacrylate-methacrylic acid-copolymer and a 13FM-3FM-methyl methacrylate-methacrylic acid copolymer which satisfy the above-mentioned content ratio range are preferred.

(Method for Producing Optical Fiber)

Examples of a method of manufacturing an optical fiber include a melt spinning method and the like. Examples of a method of manufacturing a step-index optical fiber or a multicore optical fiber by the melt spinning method include a method including melting a core material and a clad material respectively, and performing conjugate spinning. When an optical fiber cable is used in an environment having a large difference in temperature, it is preferable to anneal the optical fiber in order to suppress pistoning. The condition of the annealing may be appropriately set depending on the material of the optical fiber. The annealing may be performed continuously or in batches.

The diameter of the optical fiber is preferably 0.1 to 5 mm, more preferably 0.2 to 4.5 mm, and still more preferably 0.3 to 4 mm, from the view points that the transmission loss of the optical fiber can be reduced and the handling property of the optical fiber is excellent. From the viewpoint of plasticizer resistance and heat resistance of the optical fiber cable, the diameter (outer diameter) of the optical fiber can be set in the range of the aforementioned formula (i) (and the following formula (iii)).

The diameter of the core in the step-index optical fiber is preferably 85% or more, more preferably 90% or more, and still more preferably 95% or more, based on the diameter of the step-index type optical fiber, from the viewpoint of the coupling efficiency with an optical element and the tolerance for the optical axis deviation. The core diameter may be 99.99% or less relative to the diameter of the step index type optical fiber.

Regarding the thickness of the cladding layer in the step-index type optical fiber, from the viewpoint of coupling efficiency with an optical element and tolerance for optical axis deviation, the ratio of the total thickness of one side of the cladding layer to the diameter of the step-index type optical fiber is preferably 0.2 to 4.0%, and more preferably 0.5 to 3.0%.

When the cladding layer is formed of two layers, the range of the thickness can be freely set by the first layer (the inner layer, the cladding layer $12a$ in the case of FIG. $2(b)$) and the second layer (the outer layer, the cladding layer $12b$ in the case of FIG. $2(b)$). When the cladding layer is formed of two layers, the ratio of the thickness of the first layer and the second layer (the first layer:the second layer) is preferably from 1:0.5 to 1:5, more preferably from 1:1 to 1:4, and still more preferably from 1:1.2 to 1:3, from the view points that the transmission loss can be reduced.

The refractive indexes of the core material and the clad material are not particularly limited as long as the refractive index of the clad material is lower than that of the core material, but since the transmission loss can be reduced, the refractive index of the core material is preferably 1.45 to 1.55, and the refractive index of the clad material is preferably 1.35 to 1.45; the refractive index of the core material is more preferably 1.46 to 1.53, and the refractive index of the clad material is more preferably 1.37 to 1.44; and the refractive index of the core material is even more preferably 1.47 to 1.51, and the refractive index of the clad material is even more preferably 1.39 to 1.43. Note that the refractive indexes are values measured using the sodium D line at 20° C.

(Manufacturing Method of Optical Fiber Cable)

An optical fiber cable of the present invention can be manufactured by coating so that the jacketing inner layer, (if necessary, the jacketing intermediate layer) and the jacketing outer layer are concentrically formed in this order on the outer periphery of an optical fiber.

As a method of coating a jacketing layer formed on the outer periphery of an optical fiber, for example, a method of coating using an extrusion coating apparatus provided with a cross head die can be mentioned. In particular, when coating a jacketing layer on a plastic optical fiber as an optical fiber, since it is possible to obtain an optical fiber cable having a uniform diameter, a method of coating using an extrusion coating apparatus provided with a cross head die is preferred. The jacketing layers may be coated one layer by one layer, and a plurality of jacketing layers may be coated simultaneously.

In a more preferred embodiment of a manufacturing method of the present invention (hereinafter, referred to as "manufacturing method E1 of the present invention"), an optical fiber cable including an optical fiber and jacketing layers formed so that the jacketing inner layer, the jacketing intermediate layer and the jacketing outer layer are concentrically formed in the order on the outer periphery of the optical fiber is manufactured. This manufacturing method includes a step of supplying a material constituting the jacketing inner layer (jacketing inner layer material) and a material constituting the jacketing intermediate layer (jacketing intermediate layer material) into a co-extrusion coating apparatus with a compression type two-layer collective coating cross head (hereinafter, referred to as "coating apparatus with two-layer collective coating cross head"), and simultaneously coating the jacketing inner layer and the jacketing intermediate layer formed on the outer periphery of the optical fiber to obtain an primary optical fiber cable. After this step, it is preferable to form the jacketing outer layer by coating the material constituting the jacketing outer layer (jacketing outer layer material) on the outer periphery of the primary optical fiber cable.

By using a method of simultaneously coating using the coating apparatus with two-layer collective coating cross head (hereinafter, referred to as "coextrusion method"), adhesion strength between the jacketing inner layer and the jacketing intermediate layer can be increased.

The coextrusion method is a method of coating by laminating the primary jacketing material and the secondary jacketing material in a molten state; for example, the method can be conducted as follows: the jacketing inner layer material and the jacketing intermediate layer material in a molten state are supplied respectively to each of two screw type extruders, and then the jacketing inner layer material and the jacketing intermediate layer material are laminated in the die (spinneret) shown in FIG. 4 of the coating apparatus with two-layer collective coating cross head to coat an optical fiber. Incidentally, in FIG. 4, sign 23 denotes a flow path of the jacketing inner layer material, sign 24 denotes a flow path of the jacketing intermediate layer material, sign 25 denotes the axis of the path through which the optical fiber, sign 26 denotes a third flow path in which the two flow paths merge, sign 21 denotes a die, sign 21*a* denotes a distal end surface, sign 22 denotes a nipple.

In the manufacturing method E1 of the present invention, the optical fiber is not particularly limited, and the above-described optical fiber can be used, and the above-described plastic optical fiber is preferred. Specifically, a plastic optical fiber having a core and at least one or more cladding layer concentrically formed on the outer periphery of the core, in which the outermost layer of the cladding layer is made of the above-described fluorine-based resin can be used, and preferably an optical fiber in which the cladding layer is made of a fluorine-based resin containing a vinylidene fluoride (VDF) unit can be used.

In the manufacturing method E1 of the present invention, it is preferable that the material constituting the jacketing inner layer is the above-described ethylene-vinyl alcohol-based resin (EVOH resin).

The content ratio of ethylene units in EVOH resin is preferably 20 to 50 mol % based on the total molar amount 100 mol % of the monomer units constituting EVOH resin for the same reason as described in the paragraphs explaining the optical fiber cable.

In the manufacturing method E1 of the present invention, it is preferable that the material constituting the jacketing intermediate layer contains the above-described polyamide-based resin (N) for the reasons described above (chemical resistance, affinity with a ferrule material, and the like). In addition, as described above, from the viewpoint of enhancing adhesion between the jacketing intermediate layer and the jacketing inner layer, a mixture of the polyamide resin (N) and a material constituting the jacketing inner layer can be used as a material constituting the jacketing intermediate layer.

As the polyamide-based resin (N), either of polyamide 66, polyamide 11 (nylon 11) or polyamide 12 (nylon 12), or either of polyamide 66 or polyamide 12, preferably polyamide 12 is preferably contained in the polyamide-based resin (N) at 80% by mass or more with respect to the total mass of the polyamide-based resin (N) for the same reason as described in the paragraphs explaining the optical fiber cable (chemical resistance, affinity with the ferrule material, further heat resistance, oxygen blocking property).

In the manufacturing method E1 of the present invention, the material constituting the jacketing outer layer (jacketing outer layer material) is a material containing at least one kind selected from the above-described polyolefin-based resin, the above-described polybutylene terephthalate-based resin, and the above-described fluorine-based resin containing no chlorine atom in its structure.

In the manufacturing method E1 of the present invention, it is preferable to simultaneously coat the jacketing inner layer and the jacketing intermediate layer so that the pull-out strength at a 30 mm coating length between the jacketing inner layer and the jacketing intermediate layer becomes 50N or more. It is more preferable to coat so that the pull-out strength becomes 60N or more, and it is further preferable to coat so that the pull-out strength becomes 70N or more. By coating so that the pull-out strength between the jacketing inner layer and the jacketing intermediate layer is 50N or more, when removing the jacketing outer layer from the optical fiber cable of the present invention, it is possible to prevent the jacketing intermediate layer from being peeled off, and hence workability at the time of attaching a plug or ferrule to the end of the optical fiber cable becomes good.

The pull-out strength between the jacketing inner layer and the jacketing intermediate layer can be adjusted by appropriately selecting a combination of a material used for the jacketing inner layer and a material used for the jacketing intermediate layer, a temperature in the co-extrusion method, a coating speed (traveling speed of the optical fiber cable), and the shape of die 21 and nipple 22 used in the two-layer collective coating cross head. A method of measuring the pull-out strength will be described later.

The manufacturing method E1 of the present invention, after obtaining a primary optical fiber cable by simultaneously coating the jacketing inner layer and the jacketing intermediate layer formed on the optical fiber, may include a step of coating the jacketing outer layer material on the outer periphery of the primary optical fiber cable. After obtaining the primary optical fiber cable, by coating the jacketing outer layer material, it is possible to control the adhesion between the jacketing outer layer and the jacketing intermediate layer. As a result, when removing the jacketing outer layer from an optical fiber cable of the present invention, it is possible to prevent the jacketing intermediate layer and the jacketing inner layer together with the jacketing outer layer from being peeled off, and hence workability at the time of attaching a plug or ferrule to the end of the optical fiber cable becomes good. Specifically, it is preferable to coat so that the pull-out strength at a 30 mm coating length between the jacketing outer layer and the jacketing intermediate layer becomes 10 to 30N The pull-out strength between the jacketing outer layer and the jacketing intermediate layer can be adjusted by appropriately selecting a combination of a material used for the jacketing outer layer and a material used for the jacketing intermediate layer, a coating temperature, a coating speed (traveling speed of the optical fiber cable), and the shape of a die and a nipple used in a cross head.

Further, in the manufacturing method E1 of the present invention, the coating can be conducted so that the following general formula (iii) and (iv) are satisfied when an outer diameter of the optical fiber is denoted by A (μm), an outer diameter of the optical fiber cable is denoted by B (μm), and a thickness of the jacketing outer layer is denoted by c (μm):

$$900 \leq A \leq 1100 \qquad (iii)$$

$$0.40 \leq 2 \times c/(B-A) \leq 0.70 \qquad (iv)$$

When satisfying the condition of the general formula (iii), by coating so as to satisfy (iv), the plasticizer resistance of an obtained optical fiber cable can be made excellent for the same reason as the reason for satisfying the aforementioned formula (i) and formula (ii) described in the paragraphs explaining the optical fiber cable. The upper limit of $2 \times c/(B-A)$ is preferably 0.70 or less, more preferably 0.65 or less, from the viewpoint of well maintaining 105° C. long-term heat resistance of the optical fiber cable. On the other hand, the lower limit of $2 \times c/(B-A)$ is preferably 0.40 or more, more preferably 0.50 or more, from the viewpoint that the plasticizer resistance of optical fiber cable becomes good.

The manufacturing method E1 of the present invention, after peeling off the jacketing outer layer of a terminal portion of the optical fiber cable by a predetermined length, may include a step of attaching a plug or ferrule to the exposed portion of the surface of the jacketing intermediate layer.

The temperature of extrusion when coating the jacketing layer on the outer periphery of the optical fiber is preferably 200° C. to 300° C., more preferably 220° C. to 280° C. When the temperature of extrusion at the time of coating the jacketing layer on the outer periphery of the optical fiber is 200° C. or higher, it is possible to obtain an excellent appearance of the optical fiber cable. When the temperature of extrusion at the time of coating the jacketing layer on the outer periphery of the optical fiber is 300° C. or less, it is possible to form a jacketing layer without impairing the original performance of the material constituting the jacketing layer.

(Size and Mechanical Properties of Optical Fiber Cable)

The diameter of the optical fiber cable is preferably 0.3 mm to 10 mm, more preferably 0.5 mm to 8 mm. When the diameter of the optical fiber cable is 0.3 mm or more, it is possible to obtain an optical fiber cable excellent in flame retardancy and long-term heat resistance. Further, when the diameter of the optical fiber cable is 10 mm or less, it is possible to obtain an optical fiber cable excellent in flexibility and handling.

The bending elastic force of the optical fiber cable is preferably 5N to 20N, more preferably 10N to 20N. When the bending elastic force of the optical fiber cable is 5N or more, it is possible to obtain an excellent flexibility of the optical fiber cable. When the bending elastic force of the optical fiber cable is 20N or less, it is possible to obtain an optical fiber cable excellent in bendability and handling properties.

In this specification, the bending elastic force of the optical fiber cable is a value measured in accordance with ISO 178.

Other Embodiments of the Optical Fiber Cable

Figure 3:
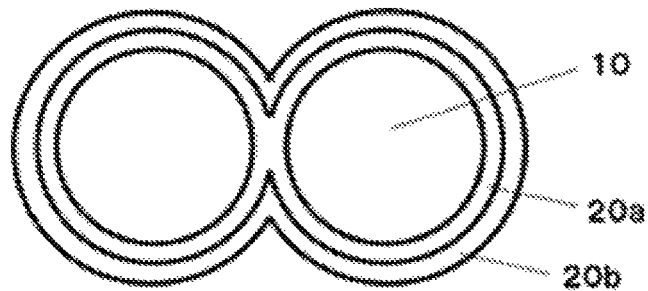
FIG. 3 is a schematic sectional view showing an example of an optical fiber cable of the present invention.

As another embodiment of the optical fiber cable, for example, as shown in FIG. 3, an optical fiber cable in which two optical fibers 10 are coated with the jacketing inner layer 20a and the jacketing outer layer 20b is mentioned.

A method of manufacturing an optical fiber cable as shown in FIG. 3 include, for example, a method of coating in which jacketing layers are formed by passing optical fibers through a crosshead provided with a die and nipple for forming two cores.

Usually, when using an optical fiber cable in a communication application, it is necessary to connect one end of the optical fiber cable to a light source system and the other end of the optical fiber cable to a light receiving system. At that time, when performing communication in two-way, an optical fiber cable having two optical fibers as shown in FIG. 3 may be used.

(Harness)

Since an optical fiber cable of the present invention is excellent in resistance to plasticizers of vinyl chloride-based resins, it can be used in the form of a harness having a jacketing layer composed of a vinyl chloride-based resin, in which an optical fiber cable is bundled with a wire cable or an electric wire.

Furthermore, an optical fiber cable of the present invention, even if used in the form of a harness, since it is excellent in 105° C. long-term heat resistance, it can be suitably used for applications in which the optical fiber cable is exposed to a high temperature environment, for example communication applications in a moving body such as automobiles, railways, airplanes, or ships, or sensor applications in factories and the likes.

EXAMPLES

Hereinafter, the present invention will be specifically described by way of examples, but the present invention is not limited to these examples.

<Measurement Method>

(Oxygen Permeability)

The oxygen permeability of the jacketing material was measured according to the method defined in ISO14663-2: 1999 (Annex C) as follows.

The material for forming the covering layer was compression-formed under heating by a compression forming machine to produce a film-like test piece having a thickness of 100 μm, and the oxygen permeability [cc·20 μm/(m$^2$·day·atm)] thereof was measured using an oxygen transparency measuring device (model: OX-TRAN (registered trademark), manufactured by MOCON Inc.) under the condition of temperature of 20° C. and humidity of 65% RH.

(105° C. Long-Term Heat Resistance)

For the optical fiber cables obtained in the examples and the comparative examples, the initial transmission loss and the initial transmission loss after being exposed to an environment of temperature of 105° C. and relative humidity of 10% or less for a long time were measured by a cut-back method of 25 m-1 m using light having wavelength of 650 nm and NA (numerical aperture) of incident light of 0.1.

In Examples 1 to 10, Comparative Examples 1 to 5, and Reference Example, the optical fiber cables were exposed for 3000 hours under the above condition. In Examples 11 to 16 and Comparative Examples 6 to 10, the fiber optic cables were exposed for 2000 hours under the above condition.

Measurement of transmission loss by the cut-back method of 25 m-1 m was carried out in accordance with IEC 60793-1-40: 2001. Specifically, an optical fiber of 25 m was set in a measuring device, and after the output power $P_2$ was measured, the optical fiber was cut into a cut-back length (1 m from the incident end); and an output power $P_1$ was measured; and the transmission loss (unit: dB/km) of light was calculated using the following equation.

[Mathematical formula 1]

$$\text{Transmission loss (dB/km)} = \frac{10 \times \log(P_1/P_2)}{0.025 - 0.001} \quad (1)$$

In addition, the following criteria were used for determination.

AA: transmission loss after long time exposure is 160 dB/km or less

A: transmission loss after long time exposure is over 160 dB/km, and 200 dB/km or less B: transmission loss after long time exposure is over 200B/km, and 360 dB/km or less C: transmission loss after long time exposure is over 360 dB/km (Resistance Test to Plasticizer of Vinyl Chloride Resin)

Each of the optical fiber cables obtained in the examples and the comparative examples was cut to a length of 30 cm, and then a vinyl chloride resin tape (trade name: satin tape, manufactured by YAZAKI Corporation) was wrapped in a spiral around the optical fiber cable to completely cover the jacketing outer layer. After exposing the optical fiber cable to an environment of temperature of 105° C. and relative humidity of 10% or less for 2000 hours, the vinyl chloride resin tape was removed, and then the optical fiber cable was wound helically around the outer periphery of a cylinder having a diameter of 50 mm, and the appearance of the jacketing layer of the optical fiber cable was visually observed. The resistance of the optical fiber cable to a plasticizer of a vinyl chloride resin was evaluated according to the following criteria. Incidentally, using a commercially available wire stripper (product name: 3000B, manufactured by VESSEL Co., Inc), the jacketing outer layer was removed to observe the jacketing intermediate layer or the jacketing inner layer.

A: no change in the jacketing outer layer, the jacketing inner layer and the jacketing intermediate layer of an optical fiber cable B: no change in the outer jacketing layer of an optical fiber cable, but cracks occur in the inner jacketing layer or the jacketing intermediate layer C: cracks occur in the outer jacketing layer of an optical fiber cable (Pull-Out Strength of Jacketing Intermediate Layer)

As an indicator of adhesion between the jacketing inner layer and the jacketing intermediate layer, the pull-out strength of the jacketing intermediate layer was measured by the following method.

For the measurement, an optical fiber cable 34 having only the jacketing inner layer and the jacketing intermediate layer after the jacketing outer layer was previously removed from an optical fiber cable was used.

Figure 5:
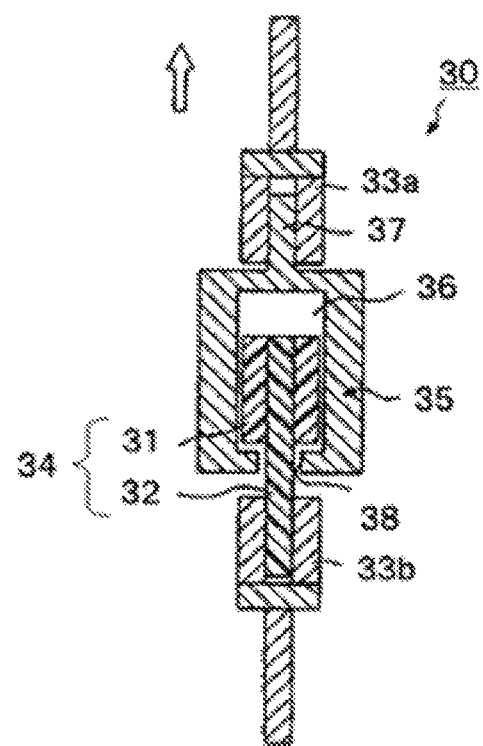
FIG. 5 is a cross-sectional view for explaining a method of measuring a jacketing layer pull-out strength of an optical fiber cable.

As shown in FIG. 5, the measurement was conducted using a tensile tester attached with measuring device 30 having jig 35 for holding optical fiber cable 34, chuck 33a for gripping protrusion 37 formed at one end of jig 35, and chuck 33b for gripping peeling portion 32 of optical fiber cable 34. In Jig 35, holding chamber 36 and through hole 38 are formed, and chamber 36 accommodates covering portion 31 of optical fiber cable 34, and through hole 38 is larger than peeling portion 32 (the outer peripheral diameter (outer diameter) of the jacketing inner layer with the optical fiber) of optical fiber cable 34, and is smaller than covering portion 31 (the outer peripheral diameter (outer diameter) of the jacketing intermediate layer).

In the measurement, an optical fiber cable was prepared by peeling off the jacketing layer on one end side, the optical fiber cable was cut to the length of coating portion 31 of 30 mm.

Next, covering portion 31 of the optical fiber cable is accommodated in holding chamber 36 formed in jig 35, and peeling portion 32 of the optical fiber cable is withdrawn from through hole 38.

Next, protrusion 37 formed at one end of jig 35 was gripped by chuck 33a, and peeling portion 32 of the optical fiber cable was gripped by chuck 33b.

Next, along the central axis direction of optical fiber cable 34 (arrow direction in the figure), jig 35 was pulled by moving chuck 33a at a constant speed of 50 mm/min, and thus coated portion 31 (thicker portion than peeling portion 32) of optical fiber cable 34 was pulled out. From a curve showing the relationship between the withdrawal stress at this time and the amount of displacement in the withdrawal direction of coating portion 31 (thicker portion than peeling portion 32) of optical fiber cable 34, the peak value of the stress at the time of withdrawal was read, and the withdrawal strength of the jacketing intermediate layer was determined.

A: pull-out strength is 50N or more

B: pull-out strength is less than 50N (Strippability of Jacketing Outer Layer)

As an indicator of adhesion between the jacketing outer layer and the jacketing intermediate layer, the strippability of the jacketing outer layer was evaluated by the following method.

From each of the optical fiber cables having an outer diameter of 2.31 mm prepared in the examples and the comparative examples, the jacketing outer layer was peeled off using a commercially available wire stripper (product name: 3000B, manufactured by VESSEL Co., Inc). Cases where the jacketing outer layer is easily peeled at once are determined to be acceptable (denoted as "A" in the table), and cases where the jacketing intermediate layer peeled together with the jacketing outer layer are determined to be unacceptable (denoted as "B" in the table).

For the blade of the cable peeling portion of the wire stripper, a portion for 1.7 mm was used. This is because, when a portion for 1.5 mm is used for the blade of the peeling portion, the jacketing intermediate layer may be damaged at the time of peeling of the jacketing outer layer, and accordingly the jacketing intermediate layer may be easily peeled off; and hence for the blade of the wire stripper, it is necessary to use a peeling blade slightly larger than the outer peripheral diameter (outer diameter) of the jacketing intermediate layer of an optical fiber cable.

(Melt Flow Index (MI))

Using a manual-tabletop type melt flow index tester (L260, manufactured by Tachiyama Kagaku Industry Co., Ltd.), a discharge amount (unit: g) of a polymer discharged from a nozzle having a diameter of 2 mm and a length of 8 mm under a condition of 230° C. and a load of 3.8 kgf (37.3N) was measured in accordance with the Japanese Industrial Standard JIS K7210. The cut-off time interval of the polymer to be discharged set at 10 seconds to 180 seconds depending on the fluidity of the polymer, the measured amount was converted into a discharge amount per 10 minutes (units: g/10 minutes), and this was defined as the melt flow index (MI) of the polymer.

(Raw Materials)

Abbreviations of the compounds used in the examples and the comparative examples are as follows.

(Cladding Layer Material))

First clad material (B-1): fluororesin (13FM/3FM/MMA/MAA copolymer, refractive index: 1.417)

Second clad material (C-1): fluororesin (VDF/TFE/HFP copolymer, VDF:TFE:HFP=48:43:9 (mass ratio), refractive index: 1.375)

Second clad material (C-2): fluororesin (VDF/TFE/HFP copolymer, VDF:TFE:HFP=30:57:13 (mass ratio), refractive index: 1.359)

Second clad material (C-3): fluororesin (VDF/TFE copolymer, VDF:TFE=80:20 (mass ratio), refractive index: 1.402)

Note that "MMA" is an abbreviation for methyl methacrylate, and "MAA" is an abbreviation for methacrylic acid.

(Material of Jacketing Inner Layer)

EVOH resin (E-1): ethylen-vinyl alcohol copolymer resin containing 29 mol % of ethylene units. Oxygen permeability is 0.2 cc·20 μm/(m$^2$·day·atm), MI=15 g/10 min (trade name: Soarnol D2908, manufactured by Nippon Synthetic Chemical Industry Co., Ltd.)

EVOH resin (E-2): ethylen-vinyl alcohol copolymer resin containing 44 mol % of ethylene units. Oxygen permeability of 1.5 cc·20 μm/(m$^2$·day·atm), MI=28 g/10 min (trade name: Soarnol A4412, manufactured by Nippon Synthetic Chemical Industry Co., Ltd.)

PVDC resin (E-3): polyvinylidene chloride-based resin. Oxygen permeability is 3.0 cc·20 μm/(m$^2$·day·atm) (trade name: Ixan PVS 109, manufactured by Solvay Specialty Polymers Japan K.K.)

PMMA resin (E-4): methyl methacrylate (MMA)-methyl acrylate (MA) copolymer, MI=2.0 g/10 min (trade name: ACRYPET VH, manufactured by Mitsubishi Chemical Corporation)

(Material of Jacketing Intermediate Layer)

Polyamide resin (N-1): Polyamide 12. Oxygen permeability is 580 cc·20 μm/(m²·day·atm) (trade name: Grilamid XE3926, manufactured by EMS-GRIVORY Ltd., MI=84 g/10 min)

(Material of Jacketing Outer Layer)

Olefin-based thermoplastic elastomer (X-1): an alloy resin of a polypropylene resin and a polyethylene resin and a vulcanized rubber component (trade name: MILASTOMER 9020NS, manufactured by Mitsui Chemicals Inc.)

Polybutylene terephthalate-based resin (X-2): PBT resin (trade name: NOVADURAN 5010N6-3X, manufactured by Mitsubishi Engineering-Plastics Corporation)

Fluorine-based resin (F-1): a copolymer of vinylidene fluoride and tetrafluoroethylene (trade name: VP100, manufactured by Daikin Industries, Ltd.)

Polyphenylene ether resin (PF-1): an alloy resin of polyphenylene ether resin and polyamide 66 (trade name: NORYL GTX 9400W, manufactured by SABIC Innovative Plastics, Ltd.)

(Flame Retardant)

Flame retardant (P-1): halogen-free phosphate ester (trade name: FP2500S, manufactured by ADEKA Corporation)

Flame retardant (P-2): halogen-containing phosphate ester (trade name: EX-5N00121C, manufactured by Nippon Pigment Co., Ltd.)

(Production of Optical Fiber)

An polymethyl methacrylate (refractive index 1.492) was used as the core material, the first clad material (B-2) was used as the clad material of the innermost layer of the cladding layer, and the second clad material (C-1) was used as the clad material of the outermost layer of the cladding layer, and spinning was conducted using a concentric circular composite spinning nozzle having a three layer structure to form a fiber, and the fiber stretched two times in the fiber axial direction in a hot air heating furnace at 140° C., thereby obtaining an optical fiber having a diameter of 1.0 mm in which the thickness of the cladding layer of the innermost layer was 5 μm and the thickness of the cladding layer of the outermost layer was 10 μm.

Example 1

The EVOH resin (E-1) was used as the material constituting the jacketing inner layer, the polyamide resin (N-1) was used as the material constituting the jacketing intermediate layer, and the olefin-based thermoplastic elastomer (X-1) was used as the material constituting the jacketing outer layer. These materials were supplied to a crosshead type cable coating apparatus of 40 mm for coating resin (manufactured by Hijiri Manufacturing Ltd.), and a jacketing inner layer (100 μm thick), a jacketing intermediate layer (155 μm thick), and a jacketing outer layer (395 μm thick) were coated on the outer periphery of the optical fiber, as a result, an optical fiber cable having a diameter of 2.30 mm was obtained. The evaluation results of the obtained optical fiber cable are shown in Table 2.

Examples 2 to 11, Comparative Examples 1 to 5

Optical fiber cables were obtained by performing the same operation as in Example 1, except that at least one of the structure of the optical fiber cable, the material constituting the jacketing inner layer, and the material constituting the jacketing outer layer was changed as shown in Table 1. The evaluation results of the obtained optical fiber cables are shown in Table 2.

In Examples 6 to 9, a resin composition obtained by melt-kneading 80 parts by mass of the polyamide resin (N-1) and 20 parts by mass of the EVOH resin (E-1) using a twin screw extruder (model name: BT-40, manufactured by Research Laboratory of Plastics Technology Co., Ltd) at 190° C., was used as the material constituting the jacketing intermediate layer.

In Example 7 and Example 8, the olefin-based thermoplastic elastomer (X-1) and the flame retardant (P-1 or P-2) were blended as described in Table 1, and a resin composition obtained by melt-kneading at 220° C. using the twin screw extruder (model name: BT-40, manufactured by Research Laboratory of Plastics Technology Co., Ltd) was used as the material constituting the jacketing outer layer.

In Comparative Example 5, a layer (inner layer) having a thickness of 160 μm made of the polybutylene terephthalate-based resin (X-2) was formed on the outer periphery of the jacketing intermediate layer, and a layer (outer layer) having a thickness of 240 μm made of polyamide 66 (PA66) was formed on the outer periphery of the layer. Since the outer layer made of the polyamide 66 (PA66) does not contain any one of a polyolefin-based resin, a polybutylene terephthalate-based resin, and a fluorine-based resin containing no chlorine atom in its structure, it does not correspond to the jacketing outer layer required in the present invention. Furthermore, the thickness (160 μm) of the inner layer made of the polybutylene terephthalate-based resin (X-2) does not satisfy the formula (ii).

TABLE 1

| | | | Jacketing Inner Layer | | | | Jacketing Intermediate Layer | | Jacketing Outer Layer | | |
| --- | --- | --- | --- | --- | --- | --- | --- | --- | --- | --- | --- |
| | First Clad Material Type | Second Clad Material Type | Material Type | Thickness μm | Oxygen Permeability cc·20 um/ m2·day·atm | Ethylene Unit mol % | Material Type (100 parts by mass) | Thickness μm | Material Type (100 parts by mass) | Plasticizer (parts by mass) | Thickness c μm |
| Example 1 | (B-1) | (C-1) | EVOH resin (E-1) | 100 | 0.2 | 29 | Polyamide resin (N-1) | 155 | Olefin-based thermoplastic elastomer (X-1) | — | 395 |
| Example 2 | (B-1) | (C-1) | EVOH resin (E-1) | 255 | 0.2 | 29 | — | — | Olefin-based thermoplastic elastomer (X-1) | — | 395 |

TABLE 1-continued

|  | First Clad Material Type | Second Clad Material Type | Jacketing Inner Layer | | | | Jacketing Intermediate Layer | | Jacketing Outer Layer | | Thickness c μm |
|---|---|---|---|---|---|---|---|---|---|---|---|
|  |  |  | Material Type | Thickness μm | Oxygen Permeability cc-20 um/m2-day-atm | Ethylene Unit mol % | Material Type (100 parts by mass) | Thickness μm | Material Type (100 parts by mass) | Plasticizer (parts by mass) |  |
| Example 3 | (B-1) | (C-1) | EVOH resin (E-1) | 100 | 0.2 | 29 | Polyamide resin (N-1) | 155 | Fluorine-based resin (F-1) | — | 395 |
| Example 4 | (B-1) | (C-1) | EVOH resin (E-1) | 100 | 0.2 | 29 | Polyamide resin (N-1) | 155 | Polybutylene terephthalate-based resin (X-2) | — | 395 |
| Example 5 | (B-1) | (C-1) | EVOH resin (E-2) | 100 | 1.5 | 44 | Polyamide resin (N-1) | 155 | Olefin-based thermoplastic elastomer (X-1) | — | 395 |
| Example 6 | (B-1) | (C-1) | EVOH resin | 100 | 0.2 | 29 | Polyamide resin (N-1): 80 parts EVOH resin (E-1): 20 parts | 155 | Olefin-based thermoplastic elastomer (X-1) | — | 395 |
| Example 7 | (B-1) | (C-1) | EVOH resin (E-1) | 100 | 0.2 | 29 | Polyamide resin (N-1): 80 parts EVOH resin (E-1): 20 parts | 155 | Olefin-based thermoplastic elastomer (X-1) | Plasticizer (P-1): 50 parts | 395 |
| Example 8 | (B-1) | (C-1) | EVOH resin (E-1) | 100 | 0.2 | 29 | Polyamide resin (N-1): 80 parts EVOH resin (E-1): 20 parts | 155 | Olefin-based thermoplastic elastomer (X-1) | Plasticizer (P-2): 100 parts | 395 |
| Example 9 | (B-1) | (C-1) | EVOH resin (E-1) | 100 | 0.2 | 29 | Polyamide resin (N-1): 80 parts EVOH resin (E-1): 20 parts | 155 | Polybutylene terephthalate-based resin (X-2) | — | 395 |
| Example 10 | (B-1) | (C-2) | EVOH resin (E-1) | 100 | 0.2 | 29 | Polyamide resin (N-1) | 155 | Olefin-based thermoplastic elastomer (X-1) | — | 395 |
| Comparative Example 1 | (B-1) | (C-1) | Polyamide resin (N-1) | 255 | 580 | — | — | — | Olefin-based thermoplastic elastomer (X-1) | — | 395 |
| Comparative Example 2 | (B-1) | (C-1) | PVDC resin (E-3) | 100 | 3.0 | — | Polyamide resin (N-1) | 155 | Olefin-based thermoplastic elastomer (X-1) | — | 395 |
| Comparative Example 3 | (B-1) | (C-1) | EVOH resin (E-1) | 255 | 0.2 | 29 | — | — | Polyphenylene ether resin (PF-1) | — | 395 |
| Comparative Example 4 | (B-1) | (C-1) | EVOH resin (E-1) | 100 | 0.2 | 29 | Polyamide resin (N-1) | 155 | Polyphenylene ether resin (PF-1) | — | 395 |
| Comparative Example 5 | (B-1) | (C-1) | EVOH resin (E-1) | 40 | 0.2 | 29 | Polyamide resin (N-1) | 215 | ①Inner layer: Polybutylene terephthalate-based resin (X-2) ②Outer layer: PA66 | — | ①160 ②240 |
| Example 11 | (B-1) | (C-3) | EVOH resin (E-1) | 100 | 0.2 | 29 | Polyamide resin (N-1) | 155 | Olefin-based thermoplastic elastomer (X-1) | — | 395 |

TABLE 2

| | 2c/ (B-A) | 105° C. long-term heat resistance | | | Resistance Test to Plasticizer 105° C. *2000 h Evaluation |
| --- | --- | --- | --- | --- | --- |
| | | Initial dB/km | After 3000 hrs dB/km | Evaluation | |
| Example 1 | 0.61 | 139 | 181 | A | A |
| Example 2 | 0.61 | 135 | 195 | A | A |
| Example 3 | 0.61 | 138 | 190 | A | A |
| Example 4 | 0.61 | 139 | 151 | AA | A |
| Example 5 | 0.61 | 139 | 185 | A | A |
| Example 6 | 0.61 | 140 | 190 | A | A |
| Example 7 | 0.61 | 140 | 189 | A | A |
| Example 8 | 0.61 | 140 | 159 | AA | A |
| Example 9 | 0.61 | 137 | 160 | AA | A |
| Example 10 | 0.61 | 141 | 183 | A | A |
| Comparative Example 1 | 0.61 | 132 | 875 | C | A |
| Comparative Example 2 | 0.61 | 140 | 220 | B | A |
| Comparative Example 3 | 0.61 | 144 | 188 | A | B |
| Comparative Example 4 | 0.61 | 147 | 159 | AA | C |
| Comparative Example 5 | 0.25 | 140 | 190 | A | C |
| Example 11 | 0.61 | 141 | 350 | B | A |

The optical fiber cables of Examples 1 to 11 were excellent in plasticizer resistance and 105° C. long-term heat resistance.

On the other hand, in the optical fiber cables of Comparative Examples 1 and 2, since the oxygen permeability of the material constituting the jacketing inner layer is high, 105° C. long-term heat resistance was insufficient.

In the optical fiber cables of Comparative Examples 3 and 4, since the material constituting the jacketing outer layer is not at least one selected from a polyolefin-based resin, a polybutylene terephthalate-based resin, and fluorine-based resin, the plasticizer resistance of optical fiber cable was insufficient.

In the optical fiber cable of Comparative Example 5, the thickness of the layer made of the polybutylene terephthalate-based resin (X2) constituting the jacketing outer layer is as small as 160 μm, since it does not satisfy the formula (ii), the plasticizer resistance of optical fiber cable was insufficient.

Example 12

The EVOH resin (E-1) was used as the material constituting the jacketing inner layer, the polyamide resin (N-1) was used as the material constituting the jacketing intermediate layer, and the olefin-based thermoplastic elastomer (X-1) was used as the material constituting the jacketing outer layer.

A primary optical fiber cable was fabricated by the following coextrusion method.

Figure 4:
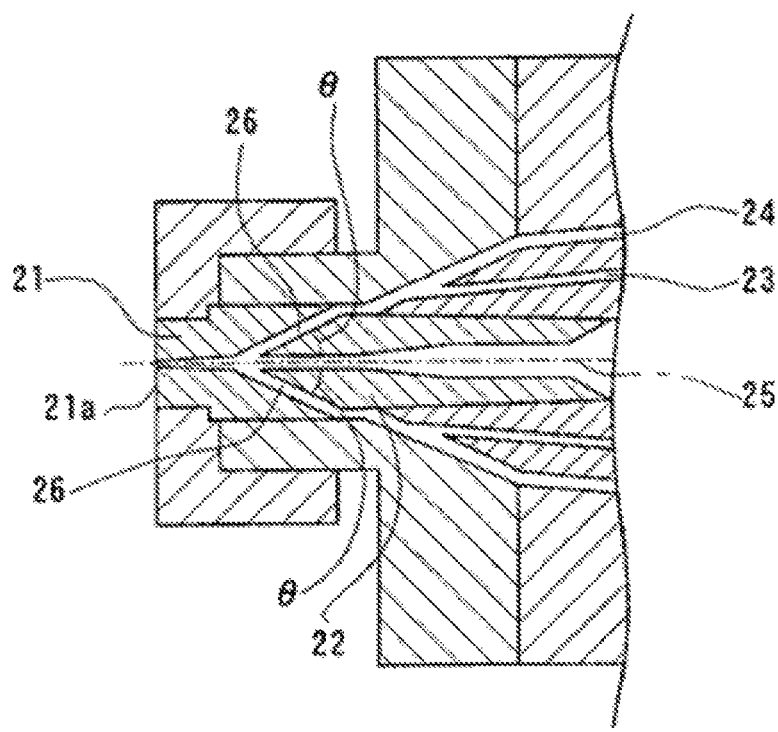
FIG. 4 is a longitudinal sectional view showing an example of a coating apparatus with a two-layer collective coating cross head used in a manufacturing method of an optical fiber cable of the present invention.

In the method, a cable coating apparatus (manufactured by Hijiri Manufacturing Ltd., φ40 mm), equipped with two extruders for the jacketing intermediate layer and the jacketing outer layer, in which one of the two extruders is provided with a compression type two-layer collective coating cross head shown in FIG. 4 as the die structure, was used. Into the cable coating apparatus, the jacketing inner layer material and the jacketing intermediate layer material are supplied, and a jacketing inner layer (thickness 50 μm) and a jacketing intermediate layer (thickness 205 μm) were coated on the outer periphery of the optical fiber, as a result, a primary optical fiber cable having a diameter of 1.51 mm was obtained.

Incidentally, the coating temperature at this time was 210° C., the angle θ formed by the third flow path 26 and the optical fiber axis 25 was 45°, the thickness of the die 21 was 3 mm, the hole diameter of the die 21 was 1.51 mm.

Subsequently, the material constituting the covering outer layer was supplied to the extruder set at 235° C., and a covering outer layer (thickness: 395 μm) was formed on the outer periphery of the primary optical fiber cable in the crosshead cable coating apparatus using a crosshead die set at 275° C., thereby obtaining an optical fiber cable having an outer diameter of 2.30 mm.

The evaluation results of the obtained optical fiber cable are shown in Table 4.

Examples 13-17

Optical fiber cables were obtained by performing the same operation as in Example 12, except that the structure of the optical fiber cable, the types of the materials constituting the jacketing inner layer, the jacketing intermediate layer and the jacketing outer layer, or thickness thereof was changed as shown in Table 3. The evaluation results of the obtained optical fiber cable are shown in Table 4.

Comparative Example 6

An optical fiber cable was obtained by performing the same operation as in Example 12, except that the material of the jacketing inner layer was not used, and only the material of the jacketing intermediate layer was supplied to the extruder for the jacketing intermediate layer, and the jacketing intermediate layer was coated so that the thickness of the jacketing intermediate layer is 255 μm. The evaluation results of the obtained optical fiber cable are shown in Table 4.

Example 18

Instead of the coextrusion method, a primary fiber optic cable was fabricated with the following single layer extrusion method:

First, a primary optical fiber cable was obtained by performing the same operation as in Example 12, except that only the material of the jacketing inner layer was supplied to the extruder for the jacketing inner layer, and the jacketing inner layer was coated so that the thickness of the jacketing inner layer is 30 μm. Then, an optical fiber cable was obtained by performing the same operation as in Example 12, except that only the material of the jacketing intermediate layer to the extruder for the jacketing intermediate layer, and the jacketing intermediate layer was coated so that the thickness of the jacketing intermediate layer is 225 μm. The evaluation results of the obtained optical fiber cable are shown in Table 4.

Example 19

An optical fiber cable was obtained by performing the same operation as in Example 18, except that the coating was performed so that the thickness of the jacketing inner layer was 100 μm and the thickness of the jacketing intermediate layer was 155 μm. The evaluation results of the obtained optical fiber cable are shown in Table 4.

Comparative Example 7

An optical fiber cable was obtained by performing the same operation as in Example 12, except that the material of the jacketing inner layer was the PMMA resin (E-4), the thickness of the jacketing inner layer was 30 μm, and the thickness of the jacketing intermediate layer was 225 μm. The evaluation results of the obtained optical fiber cable are shown in Table 4.

The optical fiber cables of Examples 12 to 17 were excellent in adhesion between the jacketing inner layer and the jacketing intermediate layer, and 105° C. long-term heat resistance.

On the other hand, the optical fiber cable of Comparative Example 6, since the jacketing layer contains no jacketing inner layer, 105° C. long-term heat resistance was insufficient.

The optical fiber cables of Examples 18 and 19 were excellent in 105° C. long-term heat resistance, but since the jacketing inner layer and the jacketing intermediate layer were not coated at the same time, the adhesion between the jacketing inner layer and the jacketing intermediate layer was inferior, as compared with the other examples in which the jacketing inner layer and the jacketing intermediate layer were coated simultaneously.

In the optical fiber cable of Comparative Example 7, since the material constituting the jacketing inner layer is not a resin having a low oxygen permeability such as EVOH resin, 105° C. long-term heat resistance was insufficient.

TABLE 3

| | First Clad Material Type | Second Clad Material Type | Jacketing Inner Layer Material Type | Jacketing Inner Layer Thickness μm | Jacketing Intermediate Layer Material Type | Jacketing Intermediate Layer Thickness μm | Jacketing Outer Layer Material Type | Jacketing Outer Layer Thickness μm | Coating Condition of Jacketing Inner Layer and Jacketing Intermediate Layer |
|---|---|---|---|---|---|---|---|---|---|
| Example 12 | (B-1) | (C-1) | (E-1) | 50 | (N-1) | 205 | (X-1) | 395 | Coextrusion method |
| Example 13 | (B-1) | (C-1) | (E-1) | 100 | (N-1) | 155 | (X-1) | 395 | Coextrusion method |
| Example 14 | (B-1) | (C-1) | (E-1) | 150 | (N-1) | 105 | (X-1) | 395 | Coextrusion method |
| Example 15 | (B-1) | (C-1) | (E-2) | 100 | (N-1) | 155 | (X-1) | 395 | Coextrusion method |
| Example 16 | (B-1) | (C-1) | (E-2) | 150 | (N-1) | 105 | (X-1) | 395 | Coextrusion method |
| Example 17 | (B-1) | (C-1) | (E-2) | 100 | (N-1) | 155 | (X-2) | 395 | Coextrusion method |
| Comparative Example 6 | (B-1) | (C-1) | — | — | (N-1) | 255 | (X-1) | 395 | — |
| Example 18 | (B-1) | (C-1) | (E-1) | 30 | (N-1) | 225 | (X-1) | 395 | Single layer extrusion method |
| Example 19 | (B-1) | (C-1) | (E-1) | 100 | (N-1) | 155 | (X-1) | 395 | Single layer extrusion method |
| Comparative Example 7 | (B-1) | (C-1) | (E-4) | 30 | (N-1) | 225 | (X-1) | 395 | Coextrusion method |

TABLE 4

| | Adhesion between Jacketing Inner Layer and Jacketing Intermediate Layer Pull-out Strength of Jacketing Intermediate Layer (N) | Strippability of Jacketing Outer Layer Evaluation | 105° C. long-term heat resistance Initial dB/km | 105° C. long-term heat resistance After 2000 hrs dB/km | 105° C. long-term heat resistance Evaluation |
|---|---|---|---|---|---|
| Example 12 | 63 | A | A | 130 | 184 | A |
| Example 13 | 66 | A | A | 131 | 159 | AA |
| Example 14 | 66 | A | A | 131 | 153 | AA |
| Example 15 | 65 | A | A | 130 | 170 | A |
| Example 16 | 67 | A | A | 130 | 160 | AA |
| Example 17 | 65 | A | A | 130 | 138 | AA |
| Comparative Example 6 | — | — | A | 131 | 300 | B |
| Example 18 | 15 | B | A | 132 | 155 | AA |
| Example 19 | 16 | B | A | 133 | 159 | AA |
| Comparative Example 7 | 70 | A | A | 139 | 293 | B |

INDUSTRIAL APPLICABILITY

Since an optical fiber cable according to the present invention is excellent in 105° C. long-term heat resistance, and flexibility, or further flame retardancy, it can be suitably used for applications such as sensors in factories or the like, communication such as in a moving medium, and wiring inside and outside equipment, and it is particularly suitable for communication applications such as in a moving medium. Examples of the moving medium include an automobile, a railway, an airplane, a ship, and the like.

An optical fiber cable obtained by a manufacturing method according to the present invention is excellent in 105° C. long-term heat resistance, and, since it is excellent in workability when attaching a plug or ferrule to the terminal portion of the optical fiber cable, particularly suitable for communication applications in a moving body such as an automobile or a railway.

REFERENCE SIGNS LIST

10 Optical fiber
11 Core
12 Cladding layer
12a Cladding layer (first layer)
12b Cladding layer (second layer)
20 Jacketing layer
20a Jacketing inner layer
20b Jacketing outer layer
20c Jacketing intermediate layer
21 Die
21a Front surface
22 Nipple
23 First flow path (flow path of jacketing inner layer material)
24 Second flow path (flow path of jacketing intermediate layer material)
25 Axis of path through which optical fiber passes
26 The 3rd flow channel
30 Pull-out strength measuring device
31 Coated portion
32 Peeling portion
33a Chuck (top)
33b Chuck (bottom)
34 Optical fiber cable
35 Jig
36 Holding chamber
37 Projection
38 Through hole

The invention claimed is:

1. An optical fiber cable comprising an optical fiber and a jacketing layer formed on the outer periphery of the optical fiber,
wherein the jacketing layer comprises at least two or more layers of a jacketing inner layer and a jacketing outer layer formed in this order concentrically;
a material constituting the jacketing inner layer is composed of a resin material having an oxygen permeability of 2.0 cc·20 μm/(m²·day·atm) or less;
a material constituting the jacketing outer layer comprises at least one selected from a polyolefin-based resin, a polybutylene terephthalate-based resin, and a fluorine-based resin containing no chlorine atom in its structure;
the optical fiber cable further comprises a jacketing intermediate layer between the jacketing inner layer and the jacketing outer layer; and
the following general formula (i) and (ii) are satisfied when an outer diameter of the optical fiber is denoted by A (μm), an outer diameter of the optical fiber cable is denoted by B (μm), and a thickness of the jacketing outer layer is denoted by c (μm):

$$900 \leq A \leq 1100 \quad (i)$$

$$0.40 \leq 2 \times c/(B-A) \leq 0.70 \quad (ii).$$

2. The optical fiber cable according to claim 1, wherein the material constituting the jacketing inner layer is an ethylene-vinyl alcohol-based resin.

3. The optical fiber cable according to claim 2, wherein a content ratio of ethylene units in the ethylene-vinyl alcohol-based resin is 20 to 50 mol % based on 100 mol % of a total amount of monomer units constituting the ethylene-vinyl alcohol-based resin.

4. The optical fiber cable according to claim 1, wherein the material constituting the jacketing outer layer is a material comprising a polyolefin-based resin, the material comprising an olefin-based thermoplastic elastomer (X) obtained by blending a rubber component into a polypropylene-based resin (A), and a phosphorus-based flame retardant (P).

5. The optical fiber cable according to claim 4, wherein, in the jacketing outer layer, a content of the phosphorus-based flame retardant (P) is 40 to 55 parts by mass with respect to 100 parts by mass of the polyolefin-based resin.

6. The optical fiber cable according to claim 1, wherein a material constituting the jacketing intermediate layer comprises a polyamide-based resin (N).

7. The optical fiber cable according to claim 6, wherein the material constituting the jacketing intermediate layer is a mixture of the polyamide-based resin (N) and the material constituting the jacketing inner layer.

8. The optical fiber cable according to claim 1, wherein the optical fiber is a plastic optical fiber.

9. The optical fiber cable according to claim 1,
wherein the optical fiber comprises a core and one or more cladding layer formed on the outer periphery of the core,
the material constituting an outermost layer of the cladding layer is any one of a copolymer containing 10 to 60% by mass of vinylidene fluoride units and 20 to 70% by mass of tetrafluoroethylene units or 5 to 35% by mass of hexafluoropropylene units, or a copolymer containing 10 to 80% by mass of ethylene units, 18 to 80% by mass of tetrafluoroethylene units, 1 to 30% by mass of hexafluoropropylene units and 1 to 10% by mass of (perfluoro) alkyl vinyl ether units.

10. A harness obtained by bundling the optical fiber cable (C1) according to claim 1, and a cable (C2) including a jacketing layer composed of a material containing a vinyl chloride-based resin.

11. The harness according to claim 10, wherein the jacketing layer of the cable (C2) contains at least one selected from di-2-ethylhexylphthalate (DOP), bis(2-ethylhexyl) phthalate (DEHP), diisononyl phthalate (DINP), adipic acid-based polyester, and tris(2-ethylhexyl) trimellitate.

12. A method of manufacturing an optical fiber cable comprising an optical fiber and a jacketing layer formed on the outer periphery of the optical fiber,
the jacketing layer being obtained by forming
a jacketing inner layer,
a jacketing intermediate layer and
a jacketing outer layer in this order concentrically,
wherein a material constituting the jacketing inner layer is an ethylene-vinyl alcohol-based resin;
a material constituting the jacketing intermediate layer comprises a polyamide-based resin (N);
the polyamide-based resin (N) is a polyamide resin composition containing either a polyamide 11 or a polyamide 12 in an amount of 80% by mass or more based on the total mass of the polyamide-based resin (N), or a polyamide 12;
a material constituting the jacketing outer layer comprises at least one selected from a polyolefin-based resin, a polybutylene terephthalate-based resin, and a fluorine-based resin containing no chlorine atom in its structure; and,
the method comprises coating the jacketing inner layer and the jacketing intermediate layer simultaneously on the outer periphery of the optical fiber by supplying the material constituting the jacketing inner layer and the material constituting the jacketing intermediate layer into a co-extrusion coating apparatus with a compression type two-layer collective coating cross head.

13. The method of manufacturing an optical fiber cable according to claim 12, wherein after coating the jacketing inner layer and the jacketing intermediate layer simultaneously, the material constituting the jacketing outer layer is coated on the outer periphery of the optical fiber.

14. The method of manufacturing an optical fiber cable according to claim 12, wherein the jacketing layer is coated so that the following general formula (iii) and (iv) are satisfied when an outer diameter of the optical fiber is denoted by A (μm), an outer diameter of the optical fiber cable is denoted by B (μm), and a thickness of the jacketing outer layer is denoted by c (μm):

$$900 \leq A \leq 1100 \qquad \text{(iii)}$$

$$0.40 \leq 2 \times c/(B-A) \leq 0.70 \qquad \text{(iv)}.$$

15. The method of manufacturing an optical fiber cable according to claim 12, wherein the optical fiber is a plastic optical fiber.

16. A method of manufacturing an optical fiber cable according to claim 12, wherein the optical fiber comprises a core and at least one or more cladding layers concentrically formed on the outer periphery of the core, and an outermost layer of the cladding layer is made of a fluorine-based resin containing a vinylidene fluoride unit.

17. A method of manufacturing an optical fiber cable according to claim 12, wherein the jacketing inner layer and the jacketing intermediate layer are simultaneously coated so that a pull-out strength at a 30 mm coating length between the jacketing inner layer and the jacketing intermediate layer is 50N or more.

18. The method of manufacturing an optical fiber cable according to claim 12, wherein a content ratio of ethylene units in the ethylene-vinyl alcohol-based resin is 20 to 50 mol % based on 100 mol % of a total molar amount of monomer units constituting the ethylene-vinyl alcohol-based resin.

19. A method of manufacturing an optical fiber cable according to claim 12, comprising attaching a plug or a ferrule to a portion where a surface of the jacketing intermediate layer is exposed, after peeling off the jacketing outer layer of a terminal portion of the optical fiber cable by a predetermined length.

20. The method of manufacturing an optical fiber cable according to claim 12,
    wherein the material constituting the jacketing outer layer is a material comprising a polyolefin-based resin, the material comprising an olefin-based thermoplastic elastomer (X) obtained by blending a rubber component into a polypropylene-based resin (A), and a phosphorus-based flame retardant (P), and
    in the jacketing outer layer, a content of the phosphorus-based flame retardant (P) is 40 to 55 parts by mass with respect to 100 parts by mass of the polyolefin-based resin.

21. The method of manufacturing an optical fiber cable according to claim 12, wherein the material constituting the jacketing intermediate layer is a mixture of the polyamide-based resin (N) and the material constituting the jacketing inner layer.

* * * * *